United States Patent
Yamamoto et al.

(10) Patent No.: US 6,684,378 B2
(45) Date of Patent: Jan. 27, 2004

(54) METHOD FOR DESIGNING POWER SUPPLY CIRCUIT AND SEMICONDUCTOR CHIP

(75) Inventors: Akira Yamamoto, Takatsuki (JP); Shirou Sakiyama, Kadoma (JP); Hiroyuki Nakahira, Katano (JP); Masayoshi Kinoshita, Hirakata (JP); Katsuji Satomi, Takatsuki (JP); Jun Kajiwara, Kyoto (JP); Shinichi Yamamoto, Hirakata (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 81 days.

(21) Appl. No.: 10/012,731

(22) Filed: Nov. 5, 2001

(65) Prior Publication Data

US 2002/0042902 A1 Apr. 11, 2002

Related U.S. Application Data

(62) Division of application No. 09/446,722, filed as application No. PCT/JP99/00586 on Feb. 10, 1999, now Pat. No. 6,460,168.

(30) Foreign Application Priority Data

Apr. 23, 1998 (JP) .......................... 10-113142

(51) Int. Cl.⁷ .............................. G06F 17/50
(52) U.S. Cl. .................. 716/10; 716/14; 716/13
(58) Field of Search .......................... 716/10, 13, 14, 716/8

(56) References Cited

U.S. PATENT DOCUMENTS

| | | | | |
|---|---|---|---|---|
| 4,612,618 A | * | 9/1986 | Pryor et al. ............... | 716/10 |
| 4,683,384 A | * | 7/1987 | Shibata et al. ............ | 326/65 |
| 5,099,406 A | | 3/1992 | Harada et al. ............ | 363/20 |
| 5,119,158 A | * | 6/1992 | Hatano ..................... | 257/203 |
| 5,422,523 A | * | 6/1995 | Roberts et al. ........... | 326/68 |
| 5,440,244 A | | 8/1995 | Richter et al. ............ | 326/37 |
| 5,452,229 A | * | 9/1995 | Shankar et al. .......... | 716/17 |
| 5,461,301 A | | 10/1995 | Truong .................... | 323/207 |

(List continued on next page.)

FOREIGN PATENT DOCUMENTS

| | | | | |
|---|---|---|---|---|
| GB | 2284717 A | * | 6/1995 | ........... H01L/21/82 |
| JP | 63-104443 | | 5/1988 | |

(List continued on next page.)

OTHER PUBLICATIONS

Uemura et al., (Japanese Patent No. 02–194548 A, 3 pages).*
Nolan et al., "The integration of power supply components within standard cells integration circuits", Proceedings of Second Annual IEEE ASIC Seminar and Exhibit, Sep. 25, 1989, pp. p13–5/1–4.*
Kuroda, Tadahiro et al., "Variable Supply–Voltage Scheme for Low–Power High Speed CMOS Digital Design" IEE Journal of Solid–State Circuits, vol. 33, No. 3, Mar. 1998.
Japanese Office Action dated Feb. 4, 2003.
International Search Report for Application PCT/JP99/00586 mailed Jun. 15, 1999.

Primary Examiner—Matthew Smith
Assistant Examiner—Phallaka Kik
(74) Attorney, Agent, or Firm—Renner, Otto, Boisselle & Sklar

(57) ABSTRACT

A power supply circuit according to the present invention is a power supply circuit formed on a semiconductor chip, including: an output transistor section outputting a power supply voltage; and a control circuit for controlling the output transistor section. The output transistor section is arranged in the vicinity of an external input/output terminal of the semiconductor chip.

10 Claims, 17 Drawing Sheets

U.S. PATENT DOCUMENTS

| | | | | |
|---|---|---|---|---|
| 5,510,731 A | * | 4/1996 | Dingwall | 326/63 |
| 5,623,198 A | * | 4/1997 | Massie et al. | 323/282 |
| 5,821,738 A | | 10/1998 | Tsuchiyama et al. | 323/222 |
| 5,825,815 A | | 10/1998 | Tsai et al. | 375/220 |
| 5,896,284 A | * | 4/1999 | Murasato et al. | 363/124 |
| 5,966,003 A | | 10/1999 | Takimoto et al. | 323/224 |
| 6,005,413 A | * | 12/1999 | Schmitt | 326/80 |
| 6,025,706 A | | 2/2000 | Takimoto et al. | 323/282 |
| 6,046,896 A | | 4/2000 | Saeki et al. | 361/86 |
| 6,104,172 A | * | 8/2000 | Josephs et al. | 323/222 |
| 6,118,303 A | * | 9/2000 | Schmitt et al. | 326/83 |
| 6,147,477 A | | 11/2000 | Saeki et al. | 323/273 |
| 6,166,562 A | | 12/2000 | Mita et al. | 326/83 |
| 6,175,952 B1 | * | 1/2001 | Patel et al. | 716/18 |
| 6,353,921 B1 | * | 3/2002 | Law et al. | 716/17 |
| 6,563,343 B1 | * | 5/2003 | Patel et al. | 326/87 |
| 6,583,646 B1 | * | 6/2003 | Patel et al. | 326/80 |
| 6,604,228 B1 | * | 8/2003 | Patel et al. | 716/8 |

FOREIGN PATENT DOCUMENTS

| | | | | |
|---|---|---|---|---|
| JP | 01255317 A | * | 10/1989 | H03K/19/173 |
| JP | 03145744 A | * | 6/1991 | H01L/21/82 |
| JP | 3-212955 | | 9/1991 | H01L/21/82 |
| JP | 3-272166 | | 12/1991 | |
| JP | 3-278579 | | 12/1991 | |
| JP | 4-165678 | | 6/1992 | |
| JP | 4-267542 | | 6/1992 | H01L/21/82 |
| JP | 5-259289 | | 10/1993 | H01L/21/82 |
| JP | 06013588 A | * | 1/1994 | H01L/27/118 |
| JP | 6-53321 | | 2/1994 | H01L/21/82 |
| JP | 6-085030 | | 3/1994 | |
| JP | 6-089973 | | 3/1994 | |
| JP | 6-112314 | | 4/1994 | |
| JP | 6-73395 | | 9/1994 | C11D/1/94 |
| JP | 6-314492 | | 11/1994 | |
| JP | 07094587 A | * | 4/1995 | H01L/21/82 |
| JP | 7-85652 | | 9/1995 | C11C/11/401 |
| JP | 7-321293 | | 12/1995 | H01L/27/04 |
| JP | 8-153390 | | 6/1996 | G11C/11/407 |
| JP | 9-162294 | | 6/1997 | H01L/21/82 |

* cited by examiner

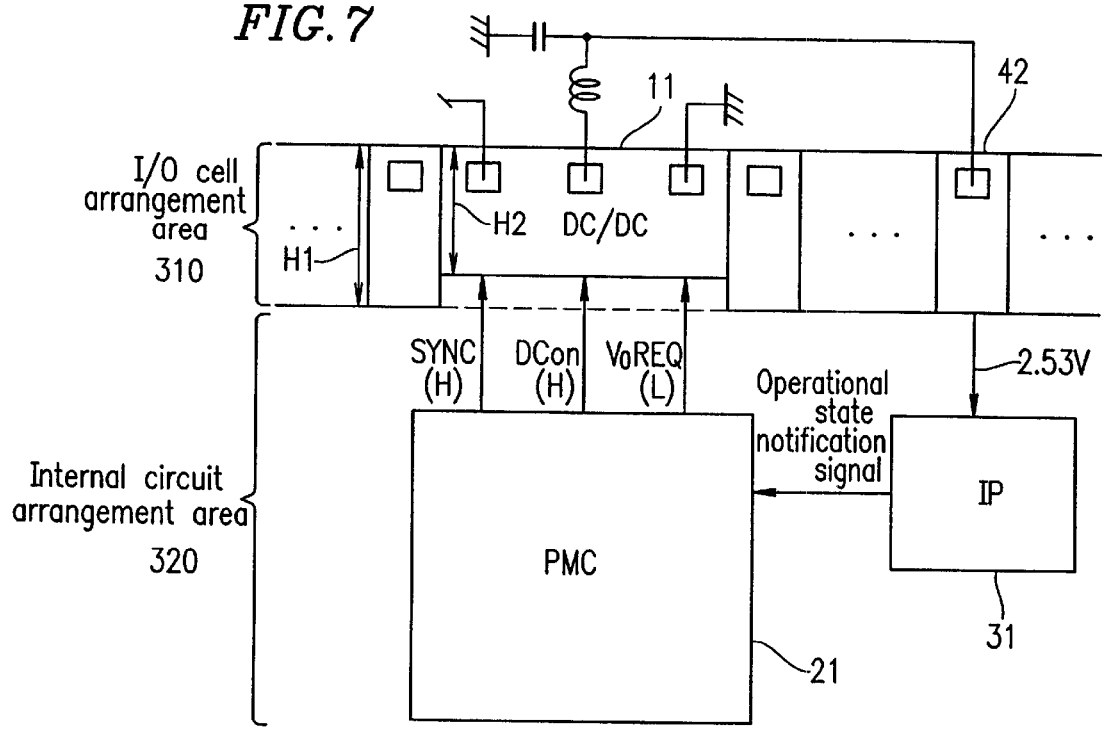

METHOD FOR DESIGNING POWER SUPPLY CIRCUIT AND SEMICONDUCTOR CHIP

This is a division application Ser. No. 09/446,722 filed Mar. 27, 2000, now U.S. Pat. No. 6,460,168 which is a 371 of PCT/JP99/00586 filed Feb. 10, 1999.

TECHNICAL FIELD

The present invention relates to a method for designing a power supply circuit and a semiconductor integrated circuit (a semiconductor chip).

BACKGROUND ART

Recently, there has been an increasing need for reducing the power consumption of a semiconductor integrated circuit (a semiconductor chip). In order to reduce the power consumption, it is effective to reduce the voltage. An approach to reduce only the voltage of the internal circuit has been employed, rather than to reduce the voltage of the entire semiconductor integrated circuit, in order to maintain the compatibility of the external interface. This requires a plurality of power sources: one for the external interface and another for the internal circuit. However, employing a plurality of power sources increases the cost. In order to reduce the cost, it is effective to employ an on-chip power supply where a power supply circuit (hereinafter, referred to as a DC/DC converter circuit) whose input is the voltage for the external interface and whose output is the voltage for the internal circuit, which is built into a semiconductor integrated circuit. As such a DC/DC converter circuit, a three-terminal regulator, a switching regulator, and the like, are known.

If a DC/DC converter circuit is mounted on a semiconductor chip, a user (a designer) does not need to provide a dedicated line on the board for providing an extra power supply voltage. This, however, has two problems as follows:

1) To produce a high performance DC/DC converter circuit which does not depend on the designing ability of a designer.

When mounting a DC/DC converter circuit on a semiconductor chip, if a designer newly designs a DC/DC converter circuit, the line resistance in the semiconductor integrated circuit is high and it is difficult to increase the power conversion efficiency. Moreover, with a switching regulator, it is not always possible to produce a high performance DC/DC converter circuit in view of the conversion efficiency and noise resulting from a switching regulator which has substantial switching noise due to its configuration, and which may affect the internal circuit of the chip.

When using a macro cell of a DC/DC converter circuit, even when a high performance macro cell is used, if the DC/DC converter circuit is provided in an area other than the area where various I/O cells are provided (i.e., an area where the internal circuit is provided), the distance between the DC/DC converter circuit and the power supply pad increases, thereby increasing the line resistance accordingly. Therefore, the DC/DC converter circuit will have a low conversion efficiency.

In any case, mounting of a high performance DC/DC converter circuit on a chip is highly dependent on the designing ability of a designer. Therefore, it is difficult to ensure production of a DC/DC converter circuit with a high performance, without depending on the designing ability of a designer (e.g. regardless of whether a designer has knowledge on on-chip power supplies).

2) To produce a flexible, high performance DC/DC converter circuit which meets the requirements of the internal structure of a system LSI without placing a burden on a designer.

When mounting a DC/DC converter circuit on a chip, a flexible design which meets the requirements of a plurality of functional blocks forming the system LSI is required. For example, when a plurality of functional blocks (IP) are provided with an optimal power management corresponding to the operational status of each functional block by using a power management circuit PMC (Power Management Circuit), the same number of DC/DC converter circuit need to be mounted on a chip as the number of functional blocks. In this case, where a DC/DC converter circuits is provided with respect to a functional block. As mentioned above, positioning of a DC/DC converter circuit on chip may reduce the conversion efficiency of the DC/DC converter circuit. It is difficult to determine appropriate positions for the DC/DC converter circuits without increasing the number of designing steps.

The present inventors have addressed the above mentioned problems as follows. A DC/DC power supply circuit cell having a DC/DC conversion function is produced as one type of I/O cell, so that a DC/DC power supply circuit cell can be treated in a manner similar to that for the other I/O cells when determining the position on the semiconductor chip where the DC/DC power supply circuit cell is to be provided. An I/O cell as used herein refers to a cell which is provided as an internal circuit of the semiconductor chip for giving/receiving a signal to/from a functional block. In view of the conversion efficiency and noise, it is preferable to produce beforehand a DC/DC power supply circuit cell having a high performance DC/DC conversion function. After determining the position on the semiconductor chip where the DC/DC power supply circuit cells are to be provided in a manner similar to that for the other I/O cells, various I/O cells including the DC/DC power supply circuit cells are arranged on the semiconductor chip by using an automated I/O cell arrangement tool. This solves the aforementioned problems (1) and (2).

An object of the present invention is to provide a high efficiency DC/DC converter circuit.

Another object of the present invention is to provide a method for designing a semiconductor chip which meets the requirements of the internal structure of the semiconductor chip, without unnecessarily giving a burden a designer.

DISCLOSURE OF THE INVENTION

A power supply circuit according to the present invention is formed on a semiconductor chip, the power supply circuit including: an output transistor section outputting a power supply voltage; and a control circuit for controlling the output transistor section. The output transistor section is arranged in the vicinity of an external input/output terminal of the semiconductor chip, so that the above-mentioned objects will be achieved.

The output transistor section may have a surge protection function.

The output transistor section may include a mesh type transistor.

The power supply circuit may be arranged along a periphery of the semiconductor chip excluding four corners thereof.

The power supply circuit includes, as the external input/output terminal, an output terminal for outputting the power supply voltage, a power supply terminal for inputting a power supply voltage to the output transistor section, and a ground terminal for inputting a ground voltage to the output transistor section. The power supply terminal and the ground terminal may be arranged in the vicinity of the output terminal.

The power supply circuit include, as the external input/output terminal, a plurality of output terminals for outputting the power supply voltage, a plurality of power supply terminals for inputting a power supply voltage to the output transistor section, and a plurality of ground terminals for inputting a ground voltage to the output transistor section. The plurality of output terminals, the plurality of power supply terminals, and the plurality of ground terminals may be covered with a common metal.

The semiconductor chip may be arranged so that a bonding wire connecting the output transistor section with a package which seals the semiconductor chip is shortest.

The output transistor section and the control circuit may be arranged in an I/O cell arrangement area.

A method for designing a semiconductor chip according to the present invention includes the steps of: determining positions on a semiconductor chip where a plurality of I/O cells are to be arranged, the plurality of I/O cells including at least one first type I/O cell having a power supply voltage conversion function for converting a first power supply voltage into a second power supply voltage and at least one second type I/O cell having a different function from that of the first I/O cell; and arranging the plurality of I/O cells based on the determined positions on the semiconductor chip, so that the abovementioned objects will be achieved.

The at least one second type I/O cell include an input power supply pad cell for inputting a power supply voltage. The second power supply voltage output from the first I/O cell may be smoothed by a smoothing circuit provided outside the semiconductor chip. The power supply voltage generated by the smoothing circuit may be input to the semiconductor chip through the input power supply pad cell.

The input power supply pad cell may be arranged in the vicinity of a functional block to which the power supply voltage generated by the smoothing circuit is provided.

The first I/O cell may have a control terminal for inputting a control signal which indicates one power supply voltage to be generated from among a plurality of power supply voltages.

The first I/O cell may have a control terminal for inputting a control signal which controls whether to perform or stop the power supply voltage conversion function.

The method for designing a semiconductor chip further includes the step of arranging at least one functional block as an internal circuit of the semiconductor chip. The at least one functional block may include a power management circuit, the power management circuit changing a mode of the power supply voltage conversion function of the first I/O cell corresponding to a predetermined functional block according to an operational state of the predetermined functional block.

The first I/O cell may include an output transistor section for converting the first power supply voltage into the second power supply voltage and a control section for controlling the output transistor section.

The output transistor section of the first I/O cell may have a surge protection function.

The output transistor section of the first I/O cell may include a mesh type transistor.

BRIEF DESCRIPTION OF THE DRAWINGS

FIG. 7 is a diagram showing the internal circuit arrangement area and the I/O cell arrangement area.

Figure 8A:
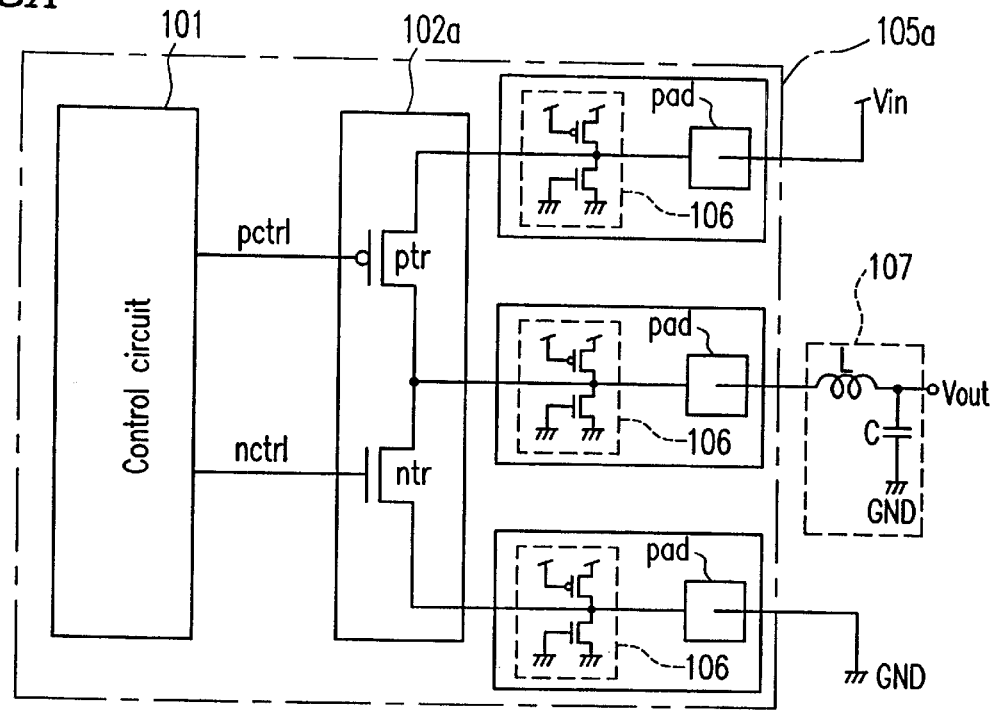
FIG. 8A is a circuit diagram showing an I/O cell of a first type.
Figure 8B:
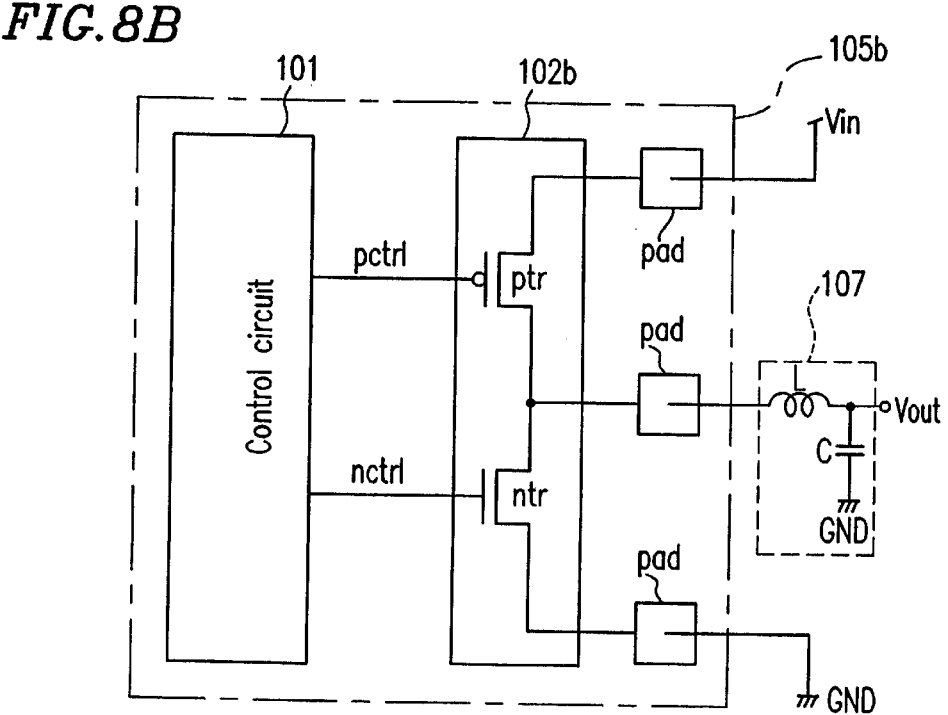
FIG. 8B is a circuit diagram showing an I/O cell of a second type.
Figure 12A:
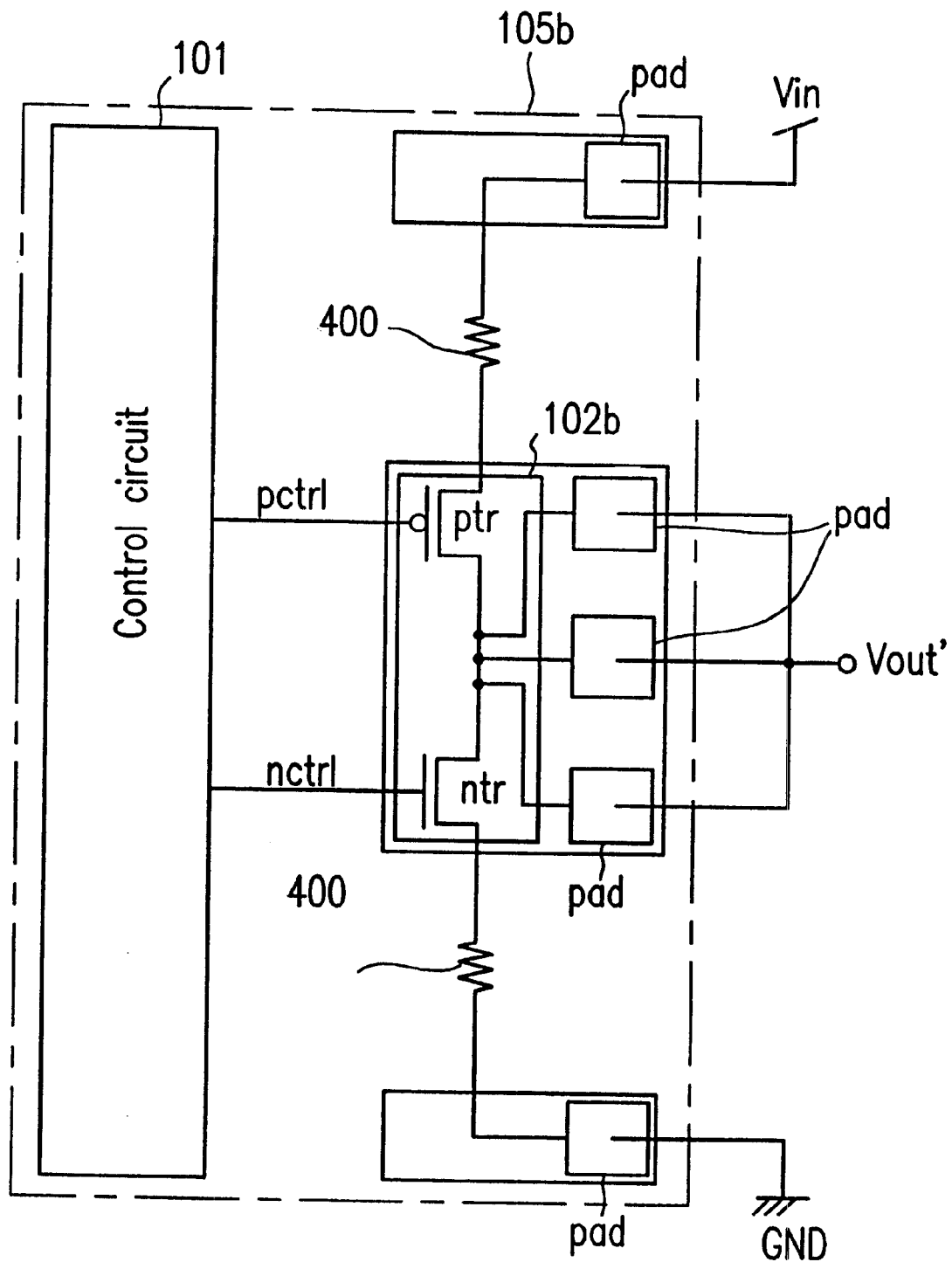
Figure 12B:
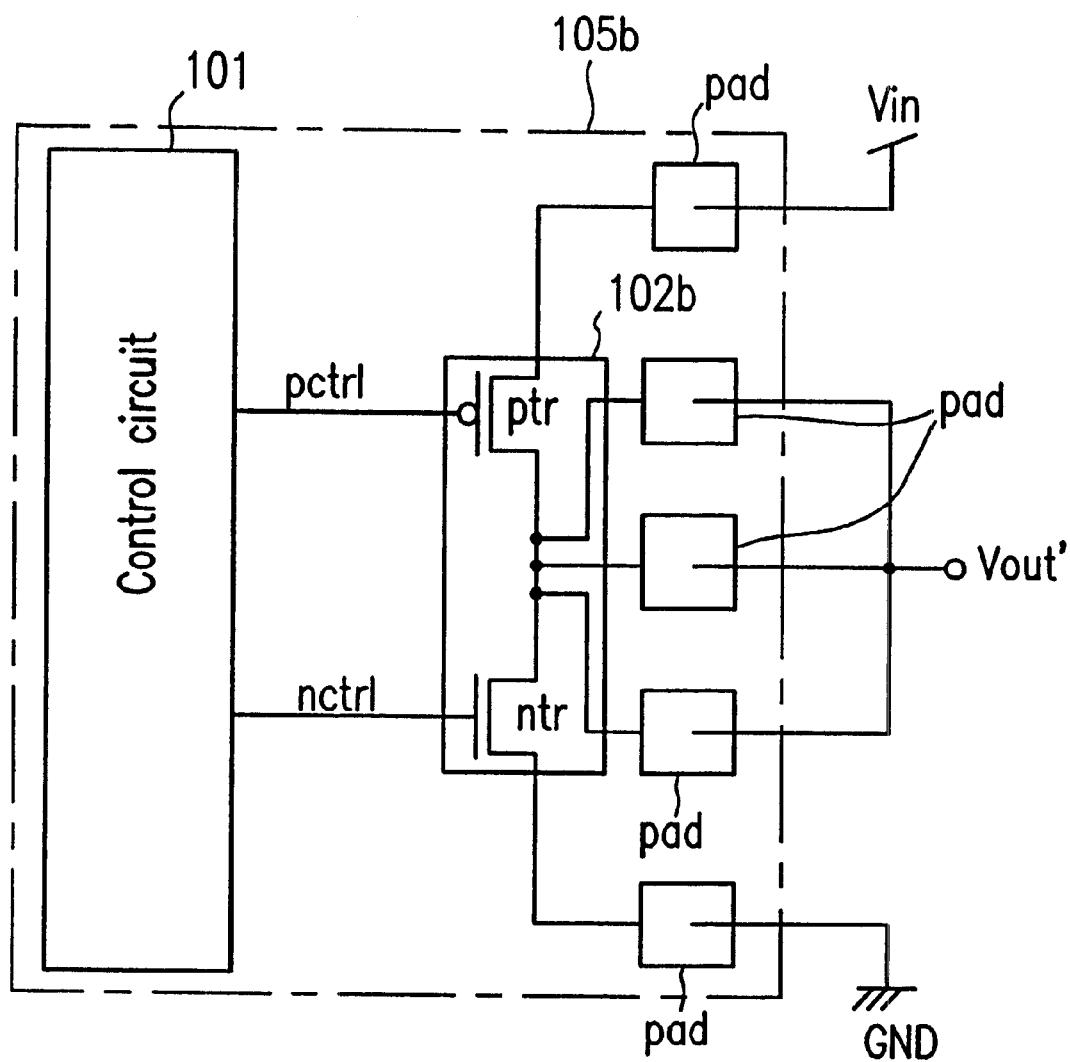

Each of FIGS. 12A and 12B is a diagram showing a variation of the second type I/O cell shown in FIG. 8B.

Figure 13A:
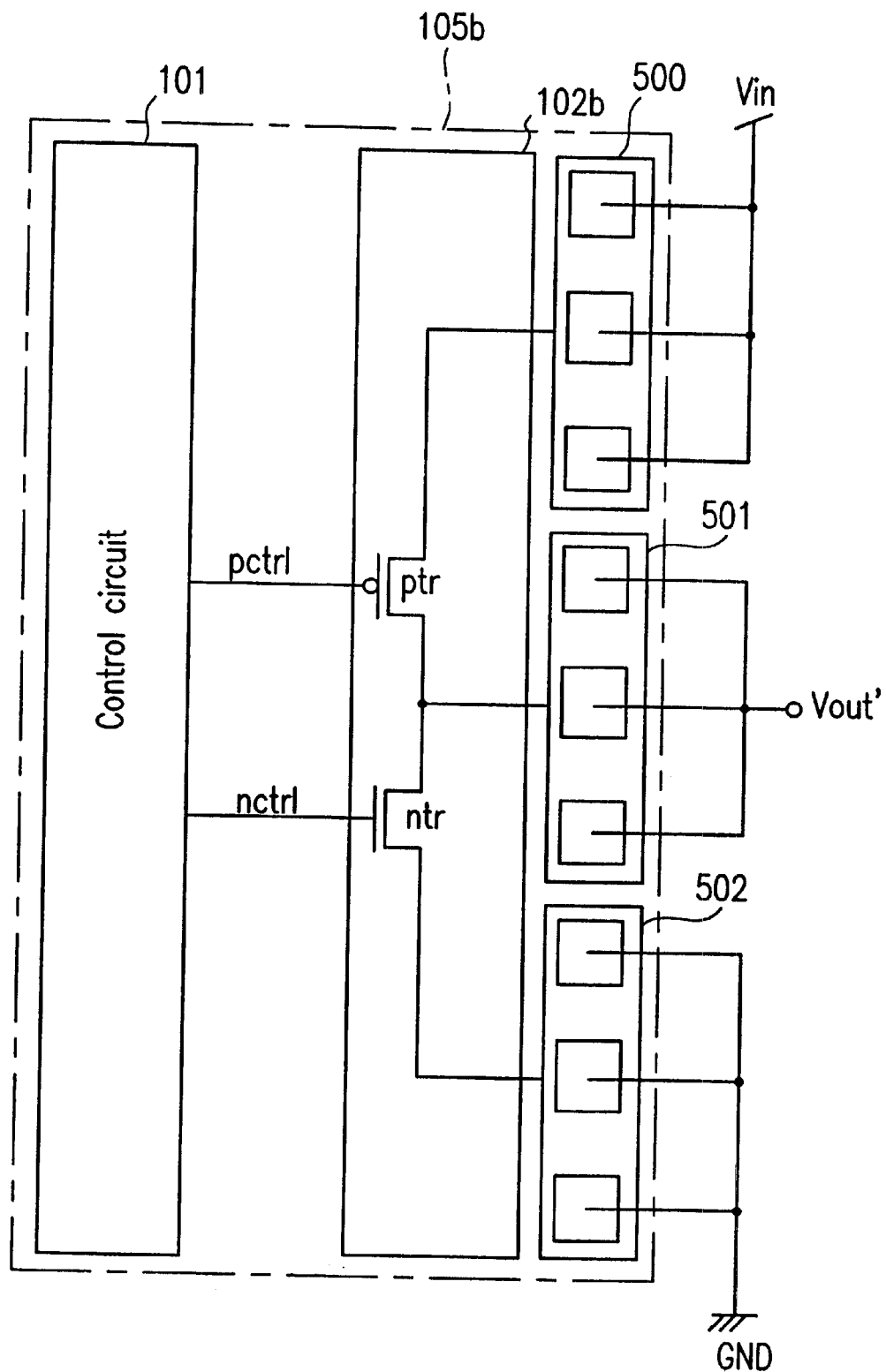
Figure 13B:
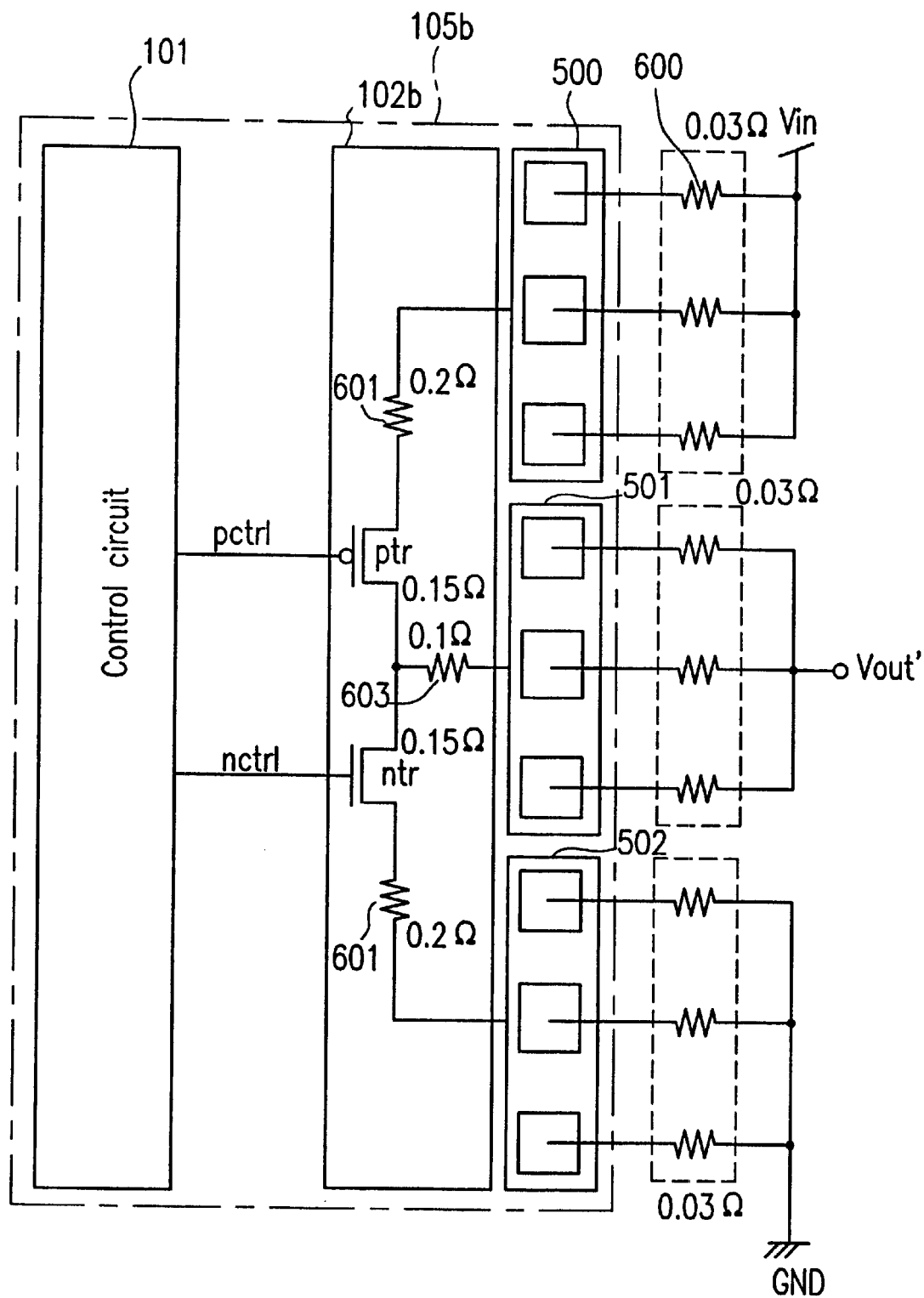

Each of FIGS. 13A and 13B is a diagrams showing another variation of the second type I/O cell shown in FIG. 8B.

Figure 14:
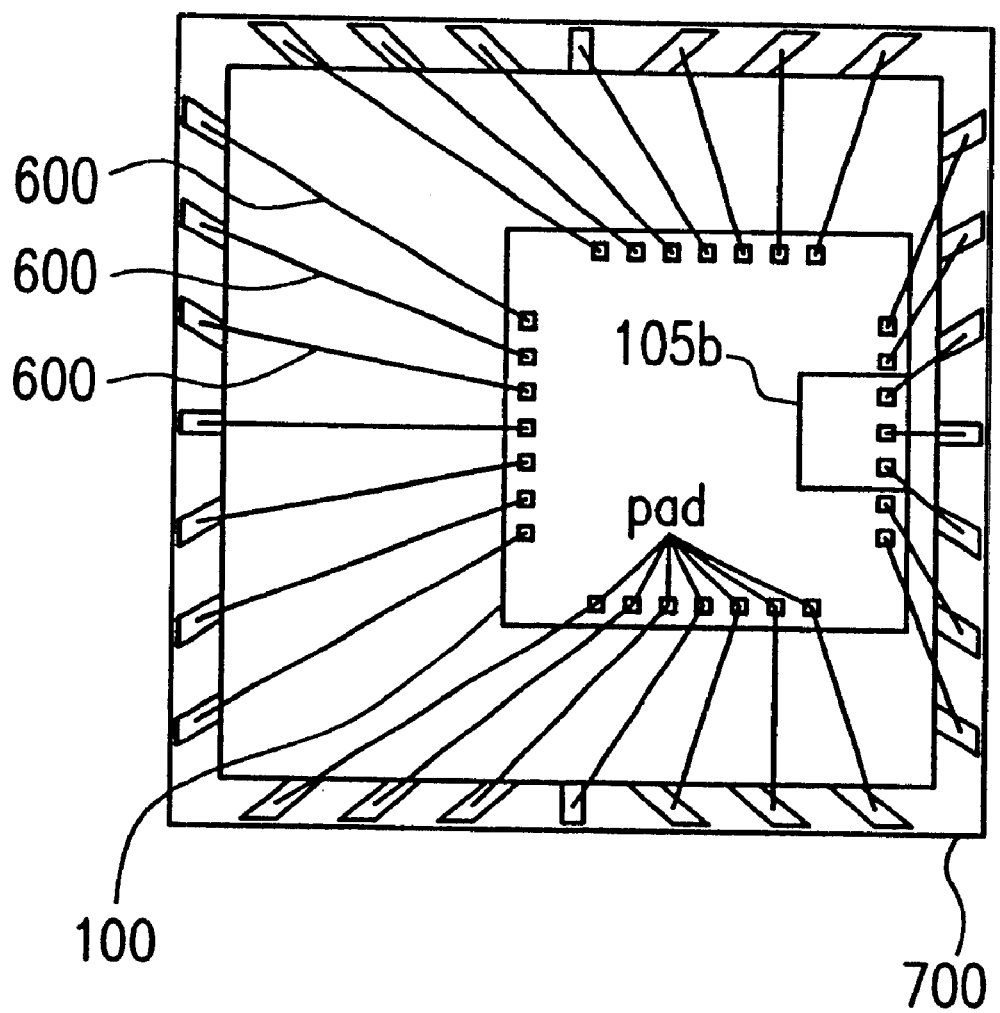

FIG. 14 is a diagram showing a method where a semiconductor integrated circuit (chip) is arranged at a position shifted from the center of the package.

Figure 15:
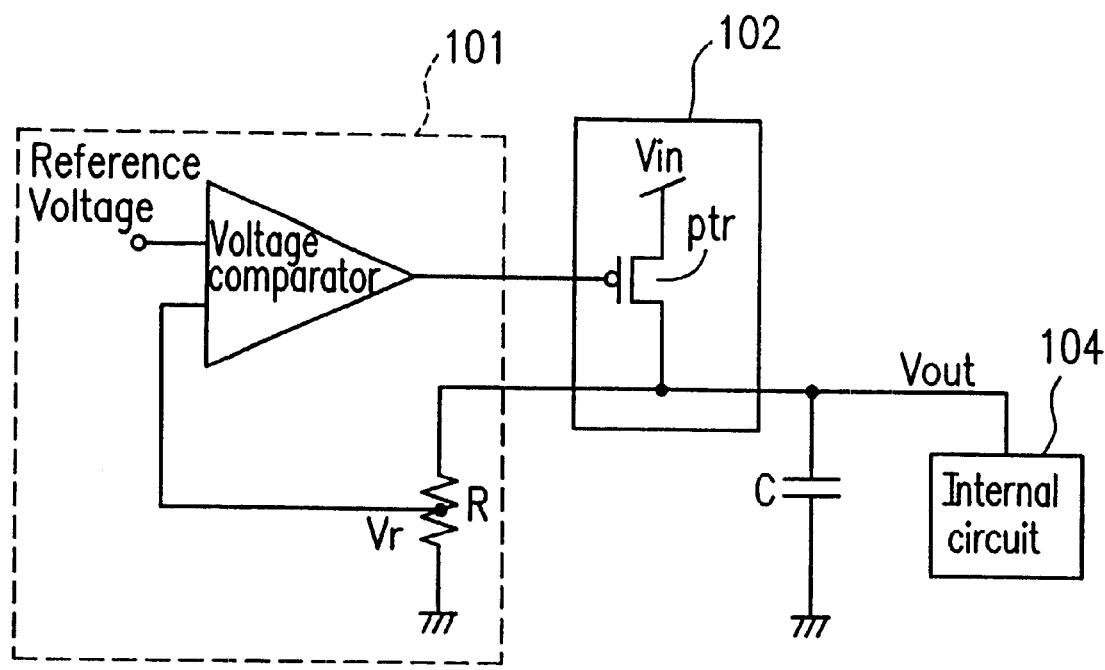

FIG. 15 is a diagram showing the present invention as being applied to a three-terminal regulator type circuit as a DC/DC converter circuit.

BEST MODE FOR CARRYING OUT THE INVENTION

A method for arranging, on a semiconductor chip, DC/DC power supply circuit cells each having a power supply voltage conversion function will now be described. A DC/DC power supply circuit cell is a type of I/O cell. An I/O cell as used herein refers to a cell which is provided as an internal circuit of the semiconductor chip for giving/receiving a signal to/from a functional block. The position on the semiconductor chip where a DC/DC power supply circuit cell is to be provided is determined in a manner similar to that for the other I/O cells. Therefore, it is possible to arrange the DC/DC power supply circuit cells on a semiconductor chip by using a commercially-available automated I/O cell arrangement tool.

Figure 1:
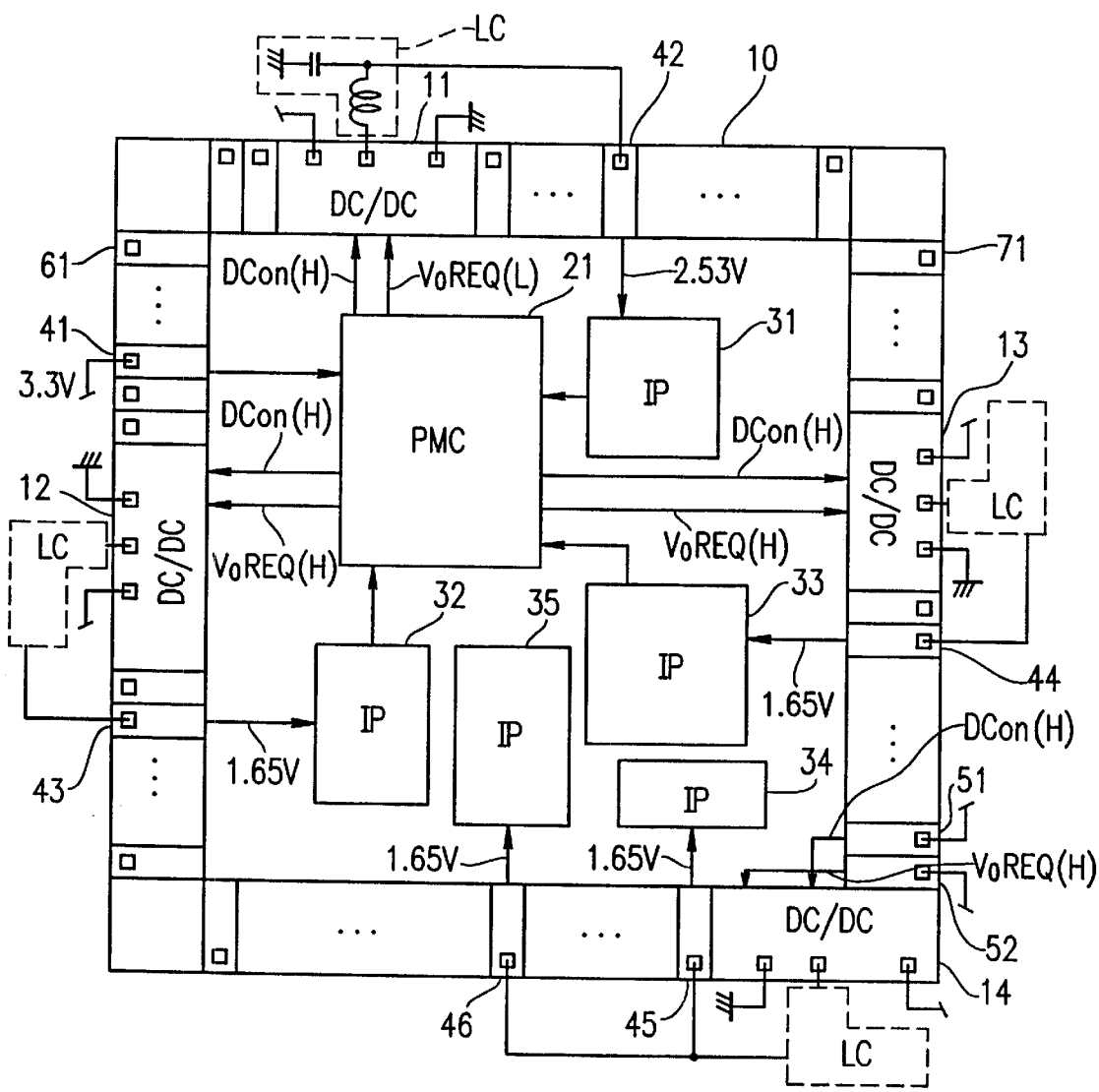
FIG. 1 is a diagram showing a configuration of a system LSI on which DC/DC power supply circuit cells according to the present invention are mounted.

FIG. 1 shows a configuration of a system LSI 1. The system LSI 1 is formed on a single semiconductor chip 10. The system LSI 1 includes DC/DC power supply circuit cells 11–14. These DC/DC power supply circuit cells 1114 are embodiments of the power supply circuit of the present invention. In FIG. 1, each of the DC/DC power supply circuit cells 11–14 are designated "DC/DC".

The system LSI 1 further includes a power management circuit PMC (Power Management Circuit) 21 and IPs (Internal IP cores) 31–35 as internal circuits. The PMC-21 is a functional block for performing a function of controlling the power consumption in the system LSI 1. The IPs 31–35 are each a functional block for performing a predetermined function.

A power supply of 3.3 V is provided to the PMC 21 through an input power supply pad cell 41 from the outside of the semiconductor chip 10. The PMC 21 can set a power supply voltage output from a DC/DC converter circuit mounted on each of DC/DC power supply circuit cells 11–13 to 2.53 V or 1.65 V. The power supply voltage output from the DC/DC converter circuit is provided to each of the functional block IPs 31–33 through input power supply pad cells 42–44, respectively.

The PMC 21 outputs a control signal Dcon, a control signal VoREQ and a control signal SYNC to each of the DC/DC power supply circuit cells 11–13. The control signal SYNC is not shown for the sake of simplicity of FIG. 1.

The control signal Dcon is used to control whether to perform or stop a power supply voltage conversion operation in the DC/DC power supply circuit cell. If the level of the control signal Dcon is H level, the DC/DC power supply circuit cell is in a state to perform a DC/DC operation (active state). If the level of the control signal Dcon is L level, the DC/DC power supply circuit cell is in a state to stop a DC/DC operation (inactive state).

The control signal VoREQ is used to select a power supply voltage to be output from the DC/DC converter circuit mounted on the DC/DC power supply circuit cell, from among a number (two in this case) of types of power supply voltages. If the level of the control signal VoREQ is L level, the output voltage is 2.53 V. If the level of the control signal VoREQ is H level, the output voltage is 1.65 V.

The PMC 21 outputs the control signal Dcon (H level) and the control signal VoREQ (L level) to the DC/DC power supply circuit cell 11. This is for instructing the DC/DC power supply circuit cell 11 to output a power supply voltage of 2.53 V to the functional block IP 31.

The PMC 21 outputs the control signal Dcon (H level) and the control signal VoREQ (H level) to each of the DC/DC power supply circuit cells 12 and 13. This is for instructing the DC/DC power supply circuit cell 12 to output a power supply voltage of 1.65 V to the functional block IP 32, and for instructing the DC/DC power supply circuit cell 13 to output a power supply voltage of 1.65 V to the functional block IP 33.

The PMC 21 changes the logical value of the control signal VoREQ according to the temperature and the operational frequency of each of the functional blocks IPs 31–33 so that a power supply voltage adapted to the temperature and the operational frequency can be provided to each of the functional block IPs 31–33. This is because a power supply voltage corresponding to the logical value of the control signal VoREQ is output from each of the DC/DC converter circuits mounted on the respective DC/DC power supply circuit cells 11–13 to respective one of the functional block IPs 31–33. For example, when the operational frequency of the functional block IP is high, the PMC 21 controls the DC/DC operation so that the power supply voltage output from the DC/DC converter circuit-is high; when the operational frequency of the functional block IP is low, the PMC 21 controls the DC/DC operation so that the power supply voltage output from the DC/DC converter circuit is low. In this way, it is possible to minimize the operational voltage of each functional block IP by optimizing the operational voltage of the functional block IP in accordance with the performance of the functional block IP (e.g., the temperature and the operational frequency). As a result, the power consumption of the entire system LSI can be reduced.

When the function of a particular functional block IP is not used (e.g., in a sleep mode), the PMC 21 can cut off the power supply for the particular functional block IP by bringing the level of the control signal Dcon to L level. Such a control is particularly effective when the threshold value of the MOS transistor used in the particular functional block IP is low. This is because it is possible, by cutting off the power supply, to cut off a static leak current which is likely to be generated in a MOS transistor having a low threshold value.

The functional block IPs 34 and 35 shown in FIG. 1 are not controlled by the PMC 21. The DC/DC power supply circuit cell 14 is provided to correspond to the functional block IPs 34 and 35.

A power supply voltage of 1.65 V is provided from the DC/DC-converter circuit mounted on the DC/DC power supply circuit cell 14 to the functional block IP 34 through the power supply voltage pad cell 45. A power supply voltage of 1.65 V is provided from the DC/DC converter circuit mounted on the DC/DC power supply circuit cell 14 to the functional block IP 35 through the power supply voltage pad cell 46. Thus, when providing a common power supply voltage to a plurality of functional blocks, the DC/DC power supply circuit cell can be commonly provided among the plurality of functional blocks.

The DC/DC power supply circuit cell 14 may have a similar configuration to that of the DC/DC power supply circuit cells 11–13. However, since the functional block IP 34 and 35 are not put under the control of the PMC 21, the level of the control signal Dcon, the level of the control signal VoREQ, and the level of the control signal SYNC can be fixed to respectively predetermined levels. In the example shown in FIG. 1, a DC/DC power supply circuit controlling cell 51 is used to fix the level of the control signal Dcon at H level, and a DC/DC power supply circuit controlling cell 52 is used to fix the level of the control signal VoREQ at H level. Each of the DC/DC power supply circuit controlling cells 51 and 52 is a type of I/O cell.

The I/O cells, each of which is provided as an internal circuit of the semiconductor chip for giving/receiving a signal to/from a functional block, include the DC/DC power supply circuit cells 11–14, the input power supply pad cells 41–46, the DC/DC power supply circuit controlling cells 51 and 52 as well as other cells such as an input signal pad cell 61 and an output signal pad cell 71. The input pad cell 61 is an I/O cell for inputting a signal to a functional block. The output pad cell 71 is an I/O cell for outputting a signal from a functional block.

According to the present invention, DC/DC converter circuits are mounted on respective DC/DC power supply circuit cells. When the DC/DC power supply circuit cells are arranged on a semiconductor chip, each DC/DC power supply circuit cells is treated as an I/O cell. Therefore, the position of the DC/DC power supply circuit cell on the semiconductor chip is determined in a manner similar to that for the various other I/O cells (e.g., the input power supply pad cells 41–46, the input signal pad cell 61, the output signal pad cell 71). This allows for one to arrange DC/DC power supply circuit cells on a semiconductor circuit cell in a manner similar to that for I/O cells by using a commercially-available automated I/O cell arrangement tool.

An I/O cell may be arranged in any position in an I/O cell arrangement area including the four corners along the periphery of the semiconductor chip. A DC/DC power supply circuit cell is a type of I/O cell. Therefore, the DC/DC power supply circuit cell can be arranged in an appropriate position in the I/O cell arrangement area to meet the requirement on the operational power supply voltage from a functional block included in the internal circuit of the system LSI. Herein, the requirement on the operational power supply voltage from a functional block may be a requirement to provide the optimal operational power supply voltage in accordance with the operation state of the functional block or a requirement to provide a predetermined operational power supply voltage. When the internal circuit of the system LSI includes a plurality of functional blocks, a plurality of DC/DC power supply circuit cells may be arranged in the I/O cell arrangement area so as to respectively correspond to the plurality of functional blocks.

When various I/O cells such as a DC/DC power supply circuit cell or an input power supply pad cell for providing an operational voltage to a functional block (IP block) are to be provided, the output voltage from the DC/DC power supply circuit cell is once output to the outside of the semiconductor chip, passes through an LC circuit (a smoothing circuit) provided outside the semiconductor chip, and is then input again from an input power supply pad to the semiconductor chip. The output voltage from the DC/DC power supply circuit cell is smoothed by the LC circuit (a smoothing circuit). In FIG. 1, an LC circuit (a smoothing circuit) is designated "LC".

Herein, it is important to arrange the input power supply pad cell in the vicinity of a functional block which provides the operational voltage. Thus, it is possible to minimize the amount of power lost by the metal line resistance between the input power supply pad cell and the corresponding functional block.

Figure 2:
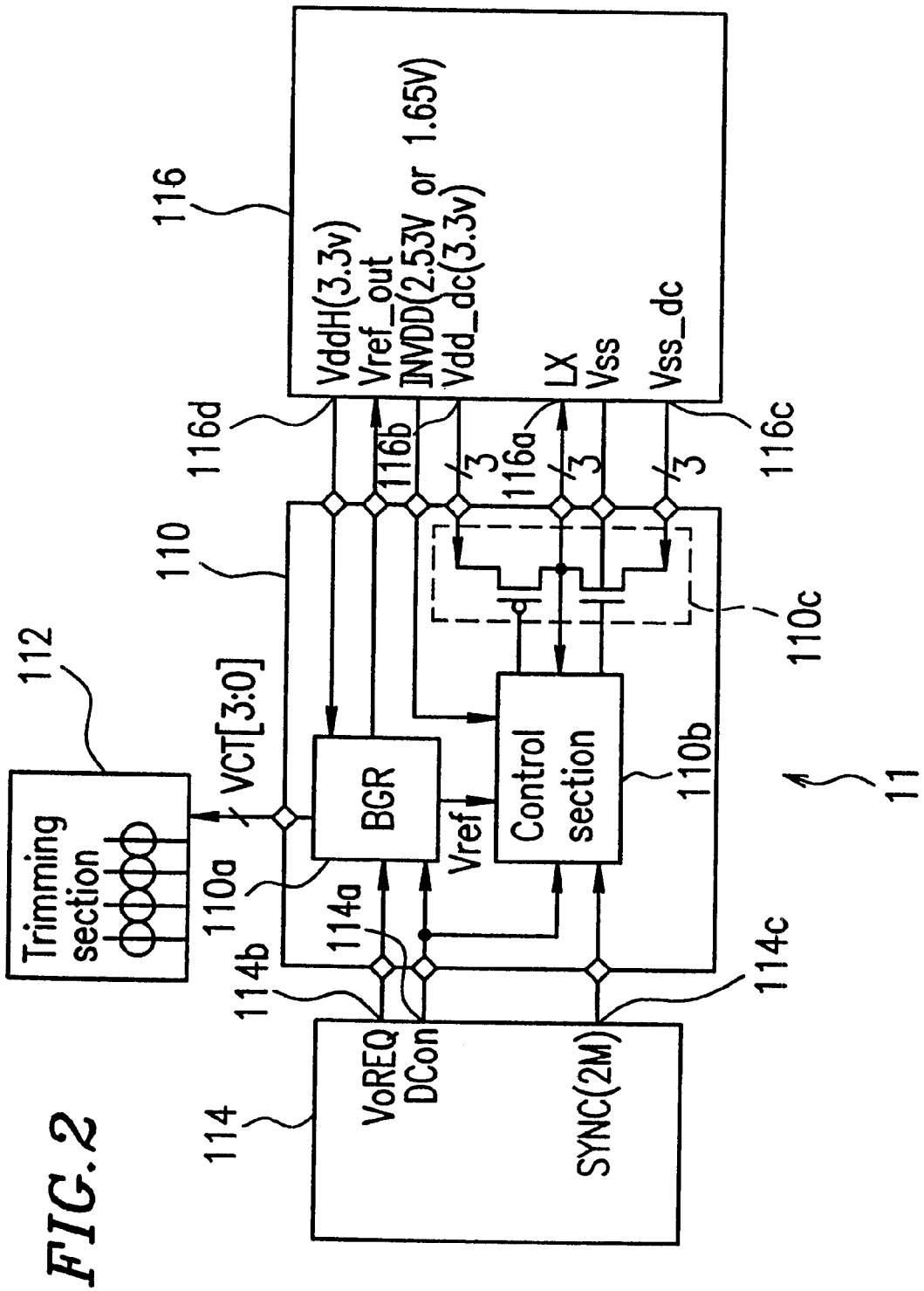
FIG. 2 is a diagram showing a configuration of circuit blocks of DC/DC power supply circuit cells according to the present invention.

FIG. 2 shows a configuration of a circuit block of the DC/DC power supply circuit cell 11 shown in FIG. 1. Each of the DC/DC power supply circuit cells 12–14 shown in FIG. 1 has a configuration similar to that of the DC/DC power supply circuit cell 11.

The DC/DC power supply circuit cell 11 has a power supply voltage conversion function to convert a power supply voltage to another power supply voltage. In the example shown in FIG. 2, a PWM clock synchronization type self-oscillation method is employed as a method for the power supply voltage conversion. The present invention is, however, not limited by the method for the power supply voltage conversion. The DC/DC power supply circuit cell 11 may have a power supply voltage conversion function according to any power supply voltage conversion method.

The DC/DC power supply circuit cell 11 includes a voltage conversion section 110 and a trimming section 112. The voltage conversion section 110 is connected to internal signal pins 114 and external pads 116.

The voltage conversion section 110 includes a reference voltage generating circuit (BGR: Band Gap Reference) 110a, a control section 110b for controlling the mode of power supply voltage conversion, and an output transistor section 110c having a surge (ESD; Electrostatic Discharge) protection function.

The reference voltage (Vref, Vref_out) output from the BGR 110a is likely to be affected by the absolute precision variation of the process variation, thus the reference voltage (Vref, Vref_out) is likely to fluctuate. The trimming section 112 is provided to suppress the fluctuation of the reference voltage (Vref, Vref_out).

As the internal signal pins 114, the DC/DC power supply circuit cell 11 includes a pin 114a for inputting the control signal Dcon, a pin 114b for inputting the control signal VoREQ, and a pin 114c for inputting the control signal SYNC.

As external pads 116, the DC/DC power supply circuit cell 11 includes a pad 116a for outputting a power supply voltage LX according to the logical value of the control signal VoREQ, a pad 116b for inputting a DC/DC switch power supply Vdd_dc (3.3 V), and a pad 116a for input ting a DC/DC ground power supply Vss_dc (0 V). These pads are connected to the output transistor section 110c. As the external pads 116, the DC/DC power supply circuit cell 11 further includes a pad 116d for inputting an analog type power supply VddH (3.3 V). This pad is connected to the BGR 110a as a power supply pin for the BGR 110a.

The BGR 110a changes the reference voltage Vref output from the BGR 110a according to the logical value of the control signal VoREQ. In response to the reference signal Vref, the control section 110b changes the value of the power supply voltage LX output from the output transistor section 110c. The power supply voltage LX is output to the outside of the DC/DC power supply circuit cell 11 through the external pad 116.

Figure 3:
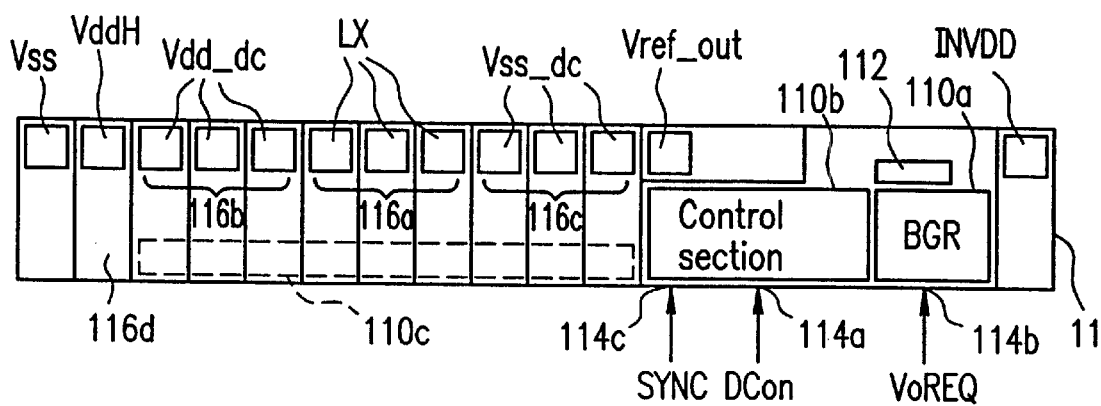
FIG. 3 is a diagram showing an arrangement of circuit blocks of DC/DC power supply circuit cells according to the present invention.

FIG. 3 shows an arrangement of a circuit block of the DC/DC power supply circuit cell 11.

Three pads are used as the pads 116a for outputting the power supply voltage LX. Similarly, three pads are used as the pads 116b, and three pads are used as the pads 116c. Three pads used for the same voltage are covered with a common metal. Thus, it is possible to minimize the resistance component of the three pads used for the same voltage. Similar effects are obtained by using two or more pads for the same voltage (signal).

Figure 4:
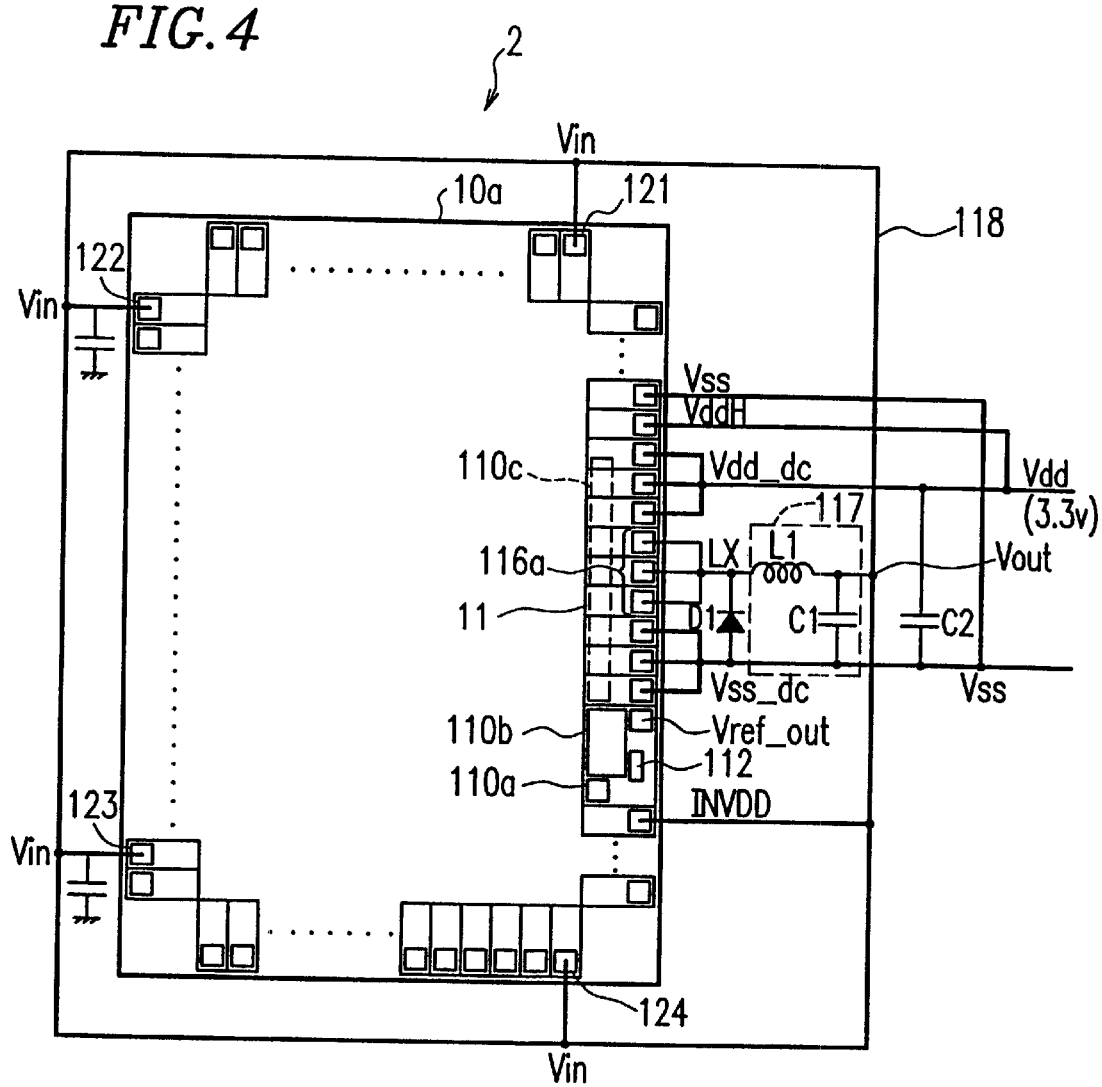
FIG. 4 is a diagram showing a recommended example of an LSI layout on which DC/DC power supply circuit cells according to the present invention are mounted.

FIG. 4 shows a recommended example of a layout of an LSI 2 on which the DC/DC power supply circuit cells 11 are mounted. In the example shown in FIG. 4, the DC/DC power supply circuit cells 11 are arranged on a semiconductor chip 10a. The power supply voltage LX output from the DC/DC power supply circuit cell 11 through the pad 116a passes through an LC circuit 117 to be provided to a bus 118 as a power supply voltage Vout. The LC circuit 117 and the bus 118 are provided outside the semiconductor chip 10a. The power supply voltage Vout is input again to the semiconductor chip 10a as a power supply voltage Vin through input power supply pad cells 121–124.

There are two main reasons why the power supply voltage VIN is input to the semiconductor chip 10a through the plurality of input power supply pad cells 121–124.

The first reason is to shorten as much as possible the distance between the input power supply pad cell and the functional block of the internal circuit to which the power supply voltage Vin is provided. The resistance component of the metal line for connecting the input power supply pad cell with the functional block of the internal circuit increases in proportion to the distance from the input power supply pad cell to the functional block of the internal circuit to, which the power supply voltage Vin is provided. If the resistance component of the metal line increases, the voltage drop caused by the current passing through the metal line increases. In order to suppress the voltage drop, it is preferable to arrange the input power supply pad cell as closely as possible to the functional block of the internal circuit to which the power supply voltage Vin is provided. For this reason, a plurality of input power supply pad cells are provided. As compared with the voltage drop caused by the metal line formed in the semiconductor chip 10a, the voltage drop caused by the bus 118 is negligible. Therefore, in order to minimize the voltage drop of the power supply voltage Vin, it is preferable to minimize the length of the metal line formed in the semiconductor chip 10a.

The second reason is to prevent the upper limit value of the output current of the input power supply pad cell from being exceeded. The upper limit value of an input power supply pad cell is predetermined for the input power supply pad cell in view of the reliability, e.g., to prevent the life of the line from being shortened due to EM (Electro Migration). For example, the example shown in FIG. 4 assumes the case where each of the four input power supply pad cells 121–124 is capable of outputting a current of up to 80 mA, and where the functional block of the internal circuit to which power supply voltage Vin is provided requires a current of, for example, 300 mA.

Figure 5:
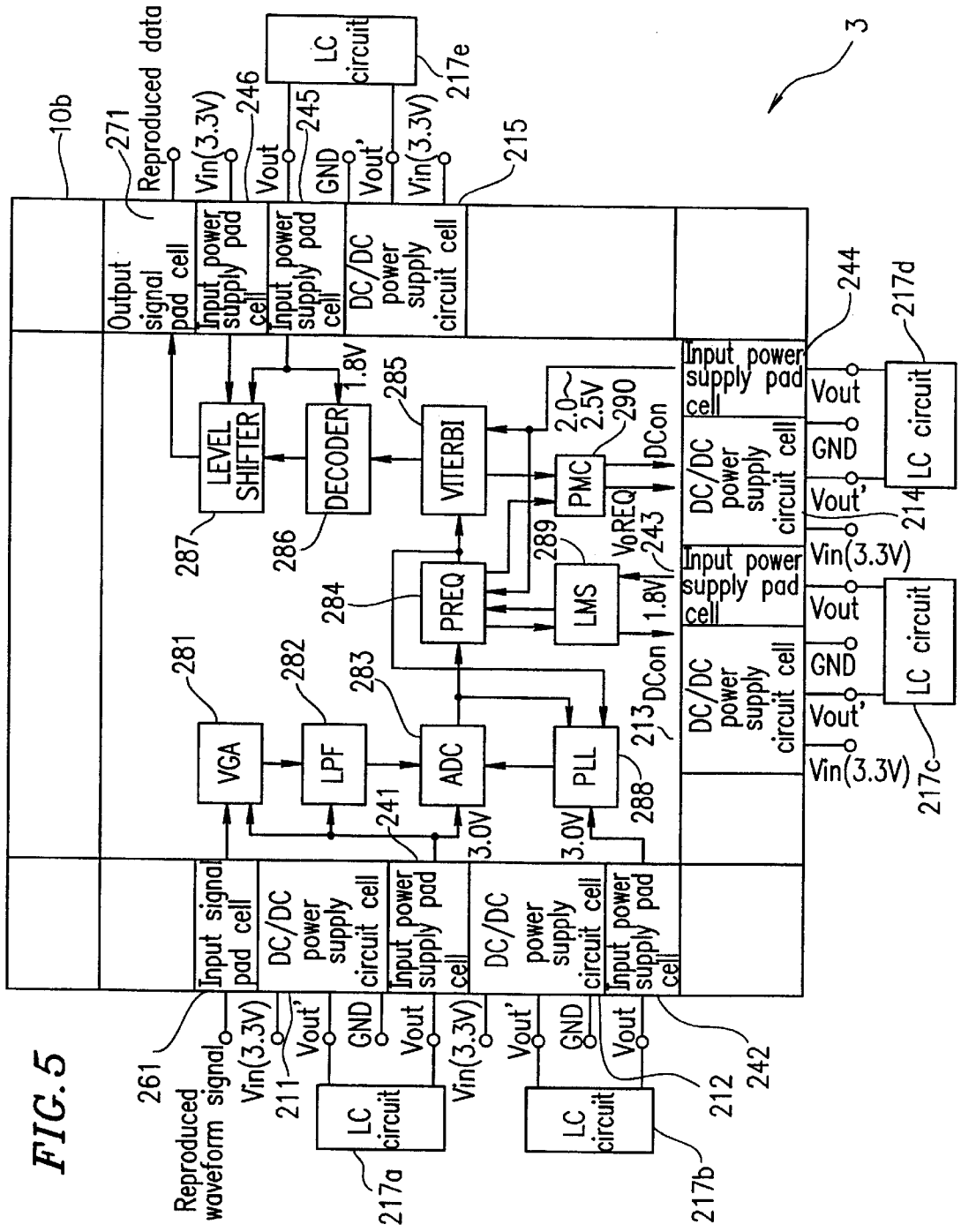
FIG. 5 is a circuit block diagram showing DC/DC power supply circuit cells according to the present invention as being applied to a PRML read channel LSI.

FIG. 5 shows a configuration of a PRML read channel LSI 3 where DC/DC power supply circuit cells 211–215 according to an embodiment of the present invention are applied to the PRML read channel LSI 3. The PRML read channel LSI 3 is formed on a single semiconductor chip 10b.

The DC/DC power supply circuit cells 211–215 shown in FIG. 5 have a higher performance than that of the DC/DC power supply circuit cells 11–14 shown in FIG. 1. This means that the DC/DC power supply circuit cells 211–215 have a function of outputting one of thirteen different power supply voltages according to a four-bit control signal VoREQ. For example, the thirteen different power supply voltages may range from 1.8 V to 3.0 V with 0.1 V intervals.

Referring to FIG. 5, the flow of a signal in the PPML read channel LSI 3 will be described.

A reproduced waveform signal obtained from a recording medium such as a magnetic disc is input to the semiconductor chip 10b from an input signal pad cell 261. A VGA (Variable Gain Amplifier) 281 amplifies the reproduced waveform signal which is input thereto. An LPF (Low Pass Filter) 282 cuts off a high frequency component in the output of the VGA 281. An ADC (Analog Digital Converter) 283 converts the output of the LPF 282 (an analog signal) into a digital signal. A PREQ (Partial Response Equalizer) 284 equalizes the output of the ADC 283 to 1, 0, -1. A VITERBI 285 performs a maximum likelihood decoding operation on the output of the PREQ 284. The data is encoded before it is written into a recording medium such as a magnetic disc. A DECODER 286 decodes the output of the VITERBI 285 for restoring the original data. A LEVEL SHIFTER 287 converts the level of the signal output from the DECODER 286. This is because the signal output to the outside of the semiconductor chip 10b is 3.3 V while the signal output from the DECODER 286 is 1.8 V. The signal whose level has been converted by the LEVEL SHIFTER 287 is output to the outside of the semiconductor chip 10b as reproduced data through the output signal pad cell 271.

A PLL (Phase Lock Loop) 288 extracts a clock signal from the output signal of the ADC 283 or the output signal of the PREQ 284. An LMS (Least Mean Square) 289 adaptively updates the tap coefficient of an FIR filter included in the PREQ 284.

Next, how to control the power supply voltage of the PRML read channel LSI 3 will now be described.

The VGA 281, the LPF 282 and the ADC 283 are analog blocks (functional blocks) for processing analog signals. An operational voltage of 3.0 V is provided to these analog blocks. The operational voltage (3.0 V) is obtained by converting the power supply voltage (3.3 V) provided from the outside of the semiconductor chip 10b by using the DC/DC power supply circuit cell 211. The power supply-voltage which has been converted by the DC/DC converter circuit mounted on the DC/DC power supply circuit cell 211 is once output to the outside of the semiconductor chip 10b and then smoothed by the LC circuit 217a provided outside the semiconductor chip 10b. The smoothed power supply voltage is again input to the semiconductor chip 10b through the input power supply pad cell 241, and then provided to the VGA 281, the LPF282 and the ADC 283.

The PLL 288 is also an analog block (an functional block). A operational voltage of 3.0 V is provided to the PLL 288. The operational voltage (3.0 V) is obtained by converting the power supply voltage (3.3 V) provided from the outside of the semiconductor chip 10b by using the DC/DC power supply circuit cell 212.

The PREQ 284 and the VITERBI 285 are functional blocks which require a high speed operation among other digital blocks for processing digital signals. An operational voltage which is variable in the range of 2.0 V to 2.5 V is provided to the PREQ 284 and the VITERBI 285. This is because it is desired to reduce the power consumption in the PREQ 284 and the VITERBI 285 as much as possible. The operational voltage provided to the PREQ 284 and the VITERBI 285 (2.0 V-2.5 V) is obtained by the DC/DC power supply circuit cell 214 performing a DC/DC operation according to the control signal VoREQ output from a PMC (Power Management Circuit) 290. The PMC 290 detects the minimum voltage at which the PREQ 284 and the VITERBI 285 are operable, and controls the DC/DC power supply circuit cell 214 to output the minimum voltage.

The DECODER 286 is a functional block whose operational speed is relatively low among other digital blocks. An operational voltage of 1.8 V is provided to the DECODER 286. The operational voltage (1.8 V) is obtained by converting a power supply voltage (3.3 V) provided from the outside of the semiconductor chip 10b by using the DC/DC power supply circuit cell 215.

The LEVEL SHIFTER 287, by nature, requires two different operational voltages of 1.8 V and 3.3 V. The 1.8 V operational voltage is provided from the DC/DC power supply circuit cell 215. The 3.3 V operational voltage is provided from the outside of the semiconductor chip 10b.

The LMS 289 is a functional block whose operational speed is relatively low. An operational voltage of 1.8 V is provided to the LMS 289. The operational voltage (1.8 V) is obtained by converting a power supply voltage (3.3 V) provided from the outside of the semiconductor chip 10b by using the DC/DC power supply circuit cell 213. When the tap coefficient of the FIR filter has converged and it is no longer necessary to adaptively update the tap coefficient, the LMS 289 sets the level of the control signal Dcon to L level. Then, the power supply from the DC/DC power supply circuit cell 213 is stopped, and it is thus possible to reduce the power consumption in the LMS 289.

Although the PRML read channel LSI 3 has been employed as the system LSI in the above description, the PRML read channel LSI 3 can alternatively be used as an IP in a different system LSI.

Figure 6:
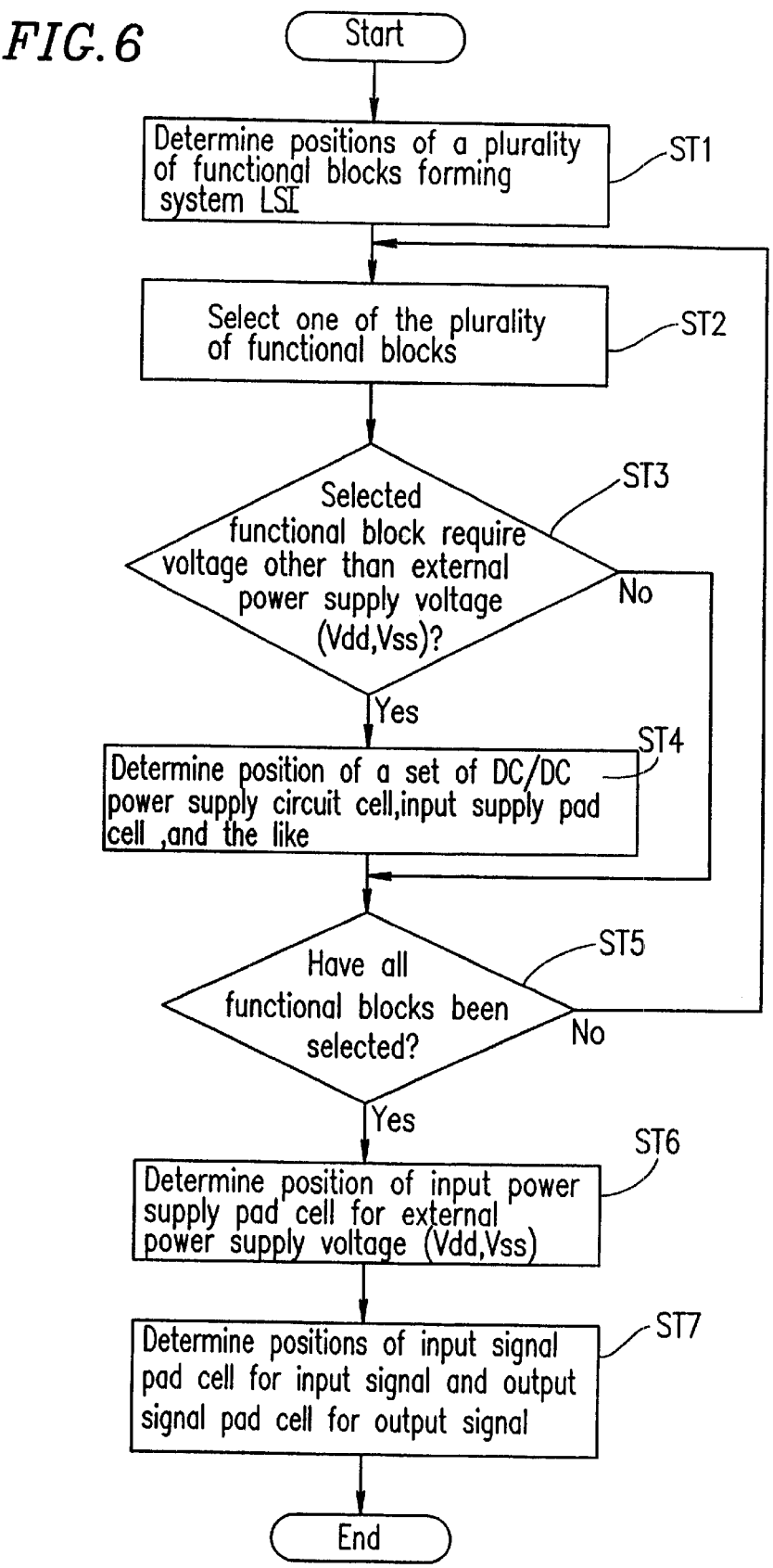
FIG. 6 shows a flow of a process for determining where various I/O cells are to be provided.

FIG. 6 shows the flow of a process for determining positions where various I/O cells are to be provided. Referring to FIG. 6, how the positions where the various I/O cells are to be provided are determined will now be described for the case of the PRML read channel LSI 3 shown in FIG. 5.

Step ST1 determines the positions on the semiconductor chip where a plurality of functional blocks mounted on a system LSI are to be arranged. In the case of the PRML read channel LSI 3, the positions on the semiconductor chip 10b where the following various functional blocks are to be arranged are determined: the VGA 281, the LPF 282, the ADC 283, the PREQ 284, the VITERBI 285, the DECODER 286, the LEVEL SHIFTER 287, the PLL 288, the LMS 289, and the PMC 290.

In step ST2, one of a plurality of the functional blocks mounted on the system LSI is selected. For example, the functional block PLL 288 is selected.

In step ST3, it is determined whether the selected functional block requires a voltage other than the external power supply voltage (Vdd, Vss). If the result is "Yes", the process proceeds to step ST4, and if the result is "No", the process proceeds to step ST5. In the case of the functional block PLL 288, it is determined that a voltage of 3.0 V is required as a voltage other than the external power supply voltage (Vdd, Vss).

In step ST4, a DC/DC power supply circuit cell and an input power supply pad cell, and the like, are combined together, and the positions on the semiconductor chip where they are to be arranged are determined. In the case of the functional block PLL 288, the DC/DC power supply circuit cell 212 and the input power supply pad cell 242 are required to provide a voltage of 3.0 V to the PLL 288. Therefore, step ST4 determines, the positions on the semiconductor chip 10b where the DC/DC power supply circuit cell 212 and the input power supply pad cell 242 are to be arranged. Herein, it is preferred that the input power supply pad cell 242 is arranged as close as possible to the PLL 288. This is because the shorter the distance between the input power supply pad cell 242 and the PLL 288, the less the number of additional internal power supply lines required is, thus suppressing the voltage drop occurring due to such internal power supply lines.

Step ST5 determines whether all of the functional blocks to be mounted on the system LSI have been selected. If the result is "Yes", the process proceeds to step ST6, and if the result is "NO", the process returns to step ST2. In this way, step ST2 and step ST3 (and step ST4, if necessary) are performed for all of the functional blocks to be mounted on the system LSI.

Step ST6 determines the position on the semiconductor chip where an input power supply pad cell for the external power supply voltage (Vdd, Vss) is to be arranged. In the case of the PRML read channel LSI 3, the step determines, for example, the position on the semiconductor chip where an input power supply pad cell 246 for a power supply voltage of 3.0 V is to be arranged.

Step ST7 determines the positions on the semiconductor chip where the input signal pad cell for input signals and the output pad cell for output signals are to be arranged. The input signals include a clock signal, for example. In the case of the PRML read channel LSI 3, the step determines, for example, the positions on the semiconductor chip where the input signal pad cell 261 for inputting a reproduced waveform signal and the output signal pad cell 271 for outputting reproduced data are to be arranged.

The flow shown in FIG. 6 can either be performed by a human or by a particular machine (or a computer). It is preferred that the flow shown in FIG. 6 is interactively performed through interactions between a human (an operator) and a specific machine (or a computer).

After determining the positions on the semiconductor chip where the functional blocks and the I/O cells are to be arranged (i.e., after a so-called floor plan is completed) as described above, the arrangement of the functional blocks and the I/O cells using a commercially-available automated arrangement and wiring tool (i.e. layout by automated I/O array production) is performed, and each functional block is wired to another functional block or an I/O cell.

As described above, according to the method for designing a semiconductor chip of the present invention, a DC/DC power supply circuit cell is treated as an I/O cell when determining the position on the semiconductor chip where the DC/DC power supply circuit cell is to be arranged. If a plurality of functional blocks to be mounted on the system LSI include any functional block which requires a voltage other than the external power supply voltage (Vdd, Vss), a DC/DC power supply circuit cell and an input power supply pad cell for providing the voltage to the functional block are each treated similarly as an I/O cell to determine the positions on the semiconductor chip where the DC/DC power supply circuit cell and the input power supply pad cell are to be arranged. Thus, the DC/DC power supply circuit cells and the input power supply pad cells are arranged and wired on the semiconductor chip by using a commercially-available I/O cell arrangement and wiring tool. In this way, a DC/DC converter circuit can be mounted on a system LSI.

The method for designing a semiconductor chip according to the present invention provides the following effects (1)-(5).

(1) The performance of a DC/DC converter circuit will not vary for different designers. When determining the position of a DC/DC power supply circuit cell including the DC/DC converter circuit on a semiconductor chip, the DC/DC power supply circuit cell is treated as an I/O cell. Thus, it is possible to always ensure a constant performance of a DC/DC converter circuit, without increasing the number of designing steps and regardless of the designer's knowledge about on-chip power supplies.

(2) When a designer newly designs a DC/DC converter circuit or uses a macro cell of a DC/DC converter circuit, if the designer arranges the DC/DC converter circuit in an area other than the area where various I/O cells are arranged (i.e., an internal circuit arrangement area), the distances between the DC/DC converter circuit and the input power supply pad will be greater than that obtained when the DC/DC power supply circuit cell of the present invention is used, whereby the conversion efficiency will be lower than that of the DC/DC power supply circuit cell of the present invention.

(3) If a DC/DC power supply circuit cell is designed to have a height less than or equal to those of the other I/O cells, the active area is not reduced. Therefore, there will be no need to change the layout of the internal circuit. FIG. 7 shows an internal circuit arrangement area 320 where the PMC 21 and the functional block IP 31, and the like, shown in FIG. 1 are arranged, and an I/O cell arrangement area 310 where a set of the DC/DC power supply circuit cells 11 and the input power supply pad cell 42 for providing a power supply voltage to the functional block IP 31 is arranged. Herein, a height H2 of the DC/DC power supply circuit cell 11 is set to be less than a height H1 of the other I/O cells (e.g. the input power supply pad cell 42). Thus, H2<H1. By setting the height H2 of the DC/DC power supply circuit cell to be less than or equal to the height H1 of the other I/O cells, it is no longer necessary to change the layout of the functional blocks to be arranged in the internal circuit arrangement area 310.

(4) As long as the DC/DC power supply circuit cell according to the present invention is used, it is not necessary to newly design a DC/DC converter circuit when designing a system LSI. Thus, it is possible to reduce the number of steps for designing a system LSI.

(5) A set of a DC/DC power supply circuit cell and an input power supply pad cell for supplying a power supply voltage to a functional block can be arranged in any position in an I/O cell arrangement area including the four corners of the semiconductor chip. Therefore, it is possible to arrange a plurality of sets of DC/DC power supply circuit cells and input power supply pad cells in accordance with a requirement of an internal circuit of the semiconductor chip.

In the above-mentioned method for designing a semiconductor chip according to the present invention, there are two types of I/O cell which have a power supply voltage conversion function to convert a power supply voltage to another power supply voltage, as follows. The first type I/O cell is an I/O cell including a surge protection diode and an output transistor section. The second type I/O cell is an I/O cell including an output transistor section having a surge protection function. While an ideal DC/DC power supply circuit cell is one with which it is possible to realize a high-efficiency and low-noise on-chip DC/DC converter, the above-mentioned first type and second type I/O cells can provide the effects as described above as long as they use the method for designing a semiconductor chip of the present invention.

FIG. 8A is a circuit diagram of an I/O cell 105a of the first type. In the first type I/O cell 105a, the an output transistor section 102a does not have a surge protection function. Such an output transistor section 102a is common.

The first type I/O cell 105a includes a control circuit 101 for controlling the mode of power supply voltage conversion, an output transistor section 102a for outputting a power supply voltage, surge protection diodes 106 for protecting the internal circuit of the semiconductor integrated circuit (chip) from a surge such as an electrostatic discharge, and external input/output terminals pad. The control circuit 101 is configured to include, for example, the BGR 110a, the control section 110b and the trimming section 112 shown in FIG. 2.

The control circuit 101 outputs a control signal pctrl and control a signal nctrl. The control signal pctrl is used to control ON/OFF of a Pch output transistor ptr included in the output transistor section 102a. The control signal nctrl is used to control ON/OFF of an Nch output transistor ntr included in the output transistor section 102a. The input voltage Vin is chopped by the output transistor section 102a and then smoothed by an LC circuit 107. As the result, the output voltage Vout is obtained.

Thus, the first type I/O cell 105a functions as a DC/DC converter circuit which converts the input voltage Vin into the output voltage Vout.

More specifically, the first type I/O cell 105a functions as a DC/DC converter circuit of a switching regulator type. A switching regulator is a circuit which converts an input voltage Vin (e.g., 3.3 V) into an output voltage Vout (e.g., 2.5 V) that is different from the input voltage Vin. The control circuit 101 chops the input voltage Vin by outputting the control signal Pctrl having a positive-phase pulse waveform to the gate of the Pch output transistor ptr, and outputting the-control signal Nctrl having a negative-phase pulse waveform to the gate of the Nch output transistor ntr. The chopped input voltage Vin is smoothed by the LC circuit 107. As the result, the output voltage Vout is obtained. Ideally, the output voltage Vout is half the input voltage Vin when the duty ratio of the pulse waveform is 50. The output voltage Vout can be changed by changing the duty ratio of the pulse waveform.

When the Pch output transistor ptr is ON, the Nch output transistor ntr is OFF. In this case, a current flows from the input terminal for inputting the input voltage Vin via the Pch output transistor ptr and an inductor L to a capacitor C and to an internal circuit (not shown) which is connected to the output terminal for outputting the output voltage Vout.

On the other hand, when the Pch output transistor ptr is OFF, the Nch output transistor ntr is ON. In this case, a current flows from the ground terminal via the Nch output transistor ntr and the inductor L to the capacitor C and the internal circuit (not shown) which is connected to the output terminal for outputting the output voltage Vout. The inductor L and the capacitor C are provided outside the first type I/O cell 105a as an external element.

With the first type I/O cell, an increase in an aluminum line resistance is inevitable, whereby it is difficult to obtain a high-efficiency DC/DC converter circuit. This will be explained below.

A semiconductor integrated circuit produced by a process after the 0.35 $\mu$m has an aluminum line resistance which is as high as about 0.1 $\Omega/\square$. Thus, for a DC/DC converter circuit built in a semiconductor integrated circuit, the aluminum line resistance has been a factor for deterioration in the performance thereof.

Figure 9:
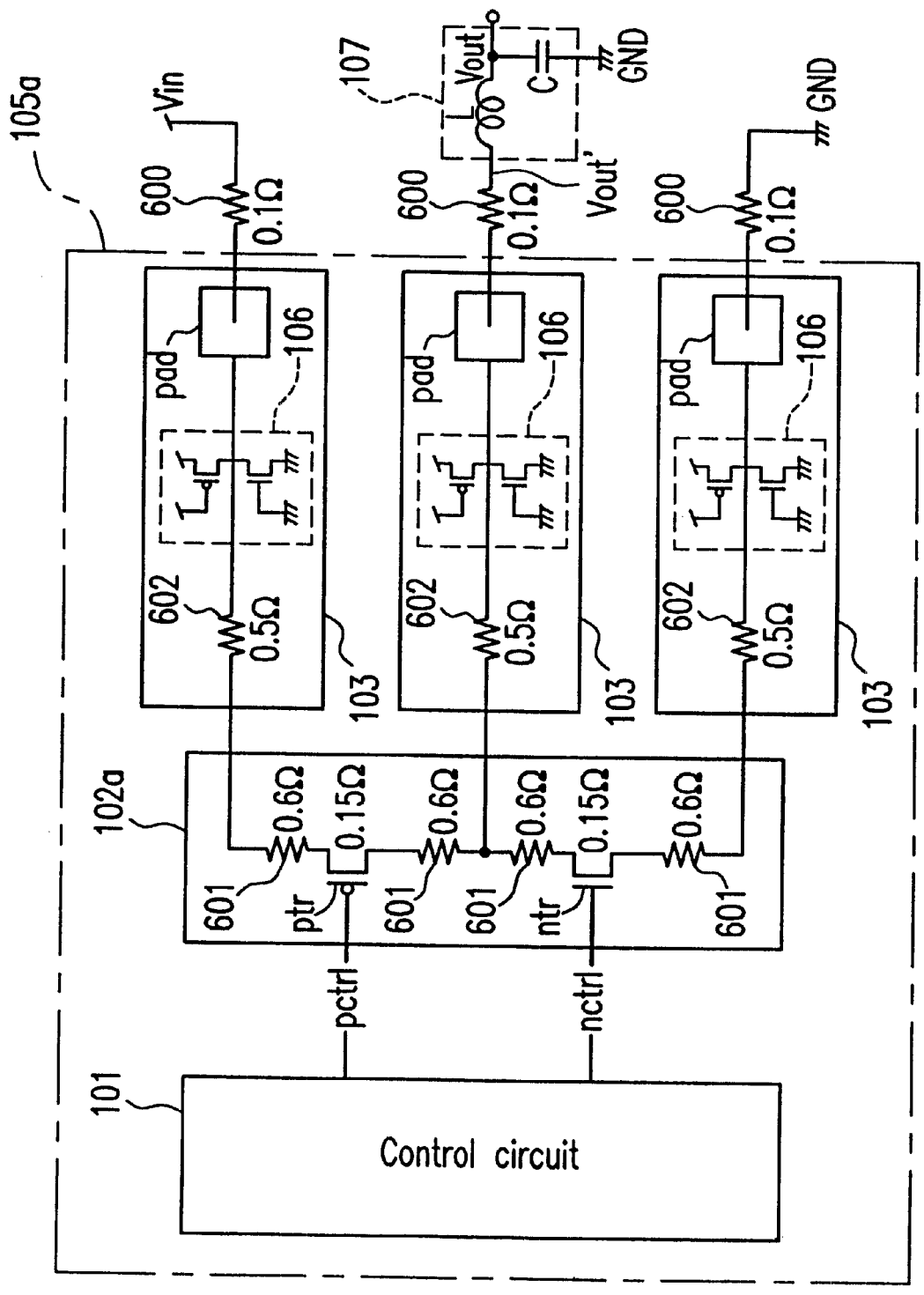
FIG. 9 is a diagram which explicitly shows the line resistance in the first type I/O cell shown in FIG. 8A.

FIG. 9 explicitly shows the line resistance existing in the circuit of the first type I/O cell 105a shown in FIG. 8A.

When the Pch output transistor ptr is ON and the Nch output transistor ntr is OFF, a current flows from the input terminal for inputting the input voltage Vin to the output terminal for outputting the output voltage Vout. Between the input terminal and the output terminal, the current passes through a bonding wire 600, a pad section 103 (an external input/output terminal pad→an aluminum line 602 on the surge protection diode 106), the output transistor section 102a (an aluminum line 601→the Pch output transistor ptr→the aluminum line 601), a pad section 103 (the aluminum line 602→the external input/output terminal pad), the bonding wire 600, and the inductor L. The total line resistance existing between the input terminal and the output terminal accumulates to a value as high as 2.55 $\Omega$. Herein, a breakdown of the line resistance is as follows: the bonding wire 600 has a resistance of about 0.1 $\Omega$; the aluminum line 602 on the surge protection diode 106 has a resistance of about 0.5 $\Omega$: the aluminum line 601 of the output transistor section 102a has a resistance of about 0.6 $\Omega$; and the ON resistance of the Pch output transistor section ptr is about 0.15 $\Omega$. Note that the line resistance of the inductor L is ignored.

The maximum current Imax for a three-terminal linear regulator and a switching regulator can be obtained by (Expression 1).

$$Imax=(Vin-Vout)/Ro \qquad \text{(Expression 1)}$$

Herein, Ro is the line resistance between the input terminal for inputting the input voltage Vin and the output terminal for outputting the output voltage Vout. Because Imax needs to be sufficiently larger than the current required by the load, Ro should be sufficiently small. Especially, as the value of the input voltage Vin is closer to that of the output voltage Vout, the effect of Ro increases.

Furthermore, the power loss Ploss of a switching regulator can be represented by (Expression 2).

$$Ploss=Ro*Io^2 \qquad \text{(Expression 2)}$$

Herein, Io is the load current.

Moreover, the efficiency $\eta$ of the DC/DC converter circuit is represented by (Expression 3).

$$\eta = Vout*Io/(Ploss+Vout*Io) \quad \text{(Expression 3)}$$

Decreasing the value Ploss is the only way to increase the efficiency of the DC/DC converter circuit, and decreasing the line resistance Ro is the only way to decrease the value Ploss.

Assuming that the output voltage Vout is 2.5 V, the load current Io is 100 mA, and the line resistance Ro is 2.55 Ω, the efficiency of the DC/DC-converter circuit is only 90.7% at most. If the value of the line resistance Ro can be reduced to 1.2 Ω, which is about one half of the original value, the maximum efficiency will be as high as 95.4%. Moreover, if the value can be reduced further to 0.6 Ω, which is one half of the previous value, the maximum efficiency will be as high as 97.7%. As described above, in the first type I/O cell 105a, the surge protection diode 106 is arranged in the vicinity of the external input/output terminal pad. Therefore, an increase in the line resistance from that of the second type I/O cell 105b to be described later is inevitable, whereby high-efficiency DC/DC conversion cannot be realized.

FIG. 8B is a circuit diagram of the second type I/O cell 105b. The second type I/O cell 105b achieves a DC/DC conversion having a higher efficiency than that of the first type I/O cell 105a.

The second type I/O cell 105b includes the control circuit 101 for controlling an output transistor section 102b, the out put transistor section 102b having a surge protection function, and the external input/output terminal pad. In the second type I/O cell 105b, the output transistor section 102b is arranged in the vicinity of the external input/output terminal pad of the semiconductor chip. This is because in the second type I/O cell 105b, there is no need to provide a surge protection diode between the output transistor section 102b and the external input/output terminal pad, whereby it is possible to arrange the output transistor section 102b closer to the external input/output terminal pad as compared to the first type I/O cell 105a.

Figure 10:
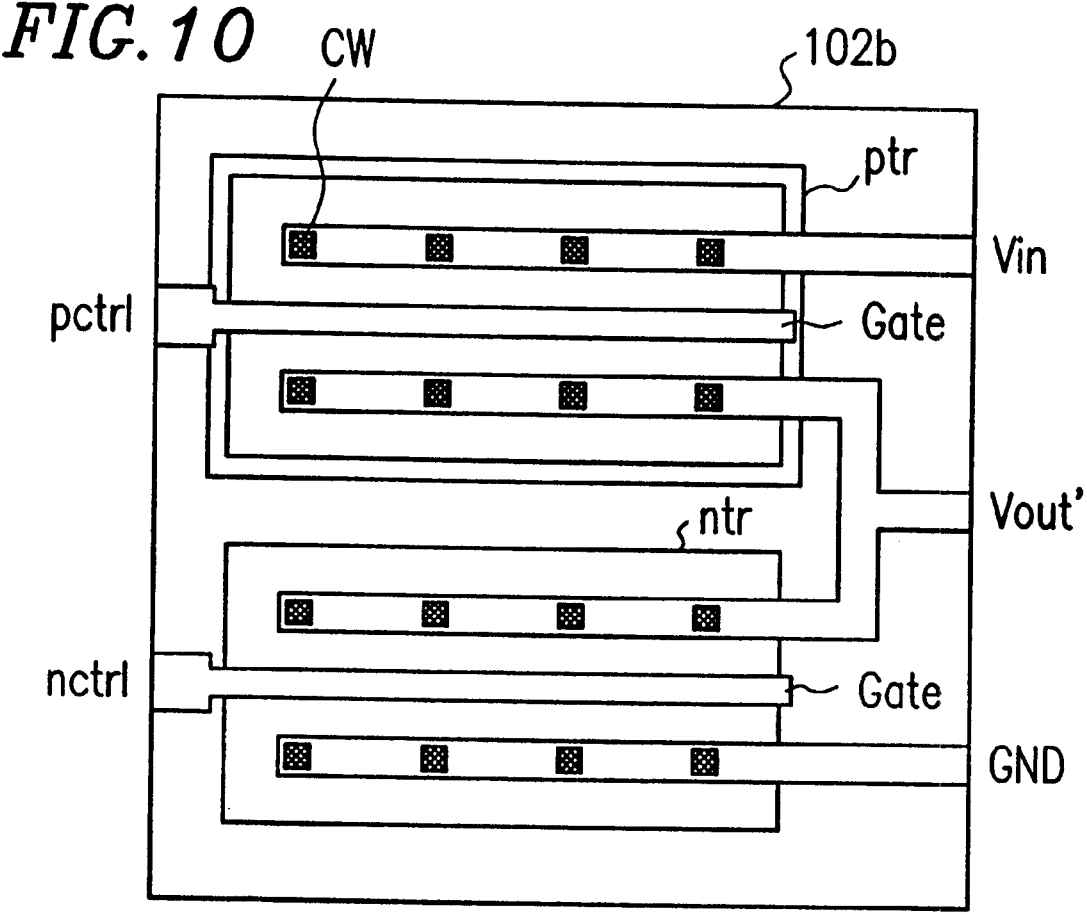
FIG. 10 is a diagram showing an exemplary layout of an output transistor section in the second type I/O cell.

FIG. 10 shows an exemplary configuration of a layout of the second type output transistor section 102b. Reference characters ptr and ntr respectively denote a Pch output transistor and a Nch output transistor each having a surge protection function. The control signal pctrl is connected to the gate of the Pch output transistor ptr, and the control signal nctrl is connected to the gate of the Nch output transistor ntr. Moreover, the in put voltage Vin is connected to the source of the Pch output transistor ptr, and the ground GND is connected to the source of the Nch output transistor ntr. The drain of the Pch output transistor ptr and the drain of the Nch output transistor ntr are connected to the output voltage Vout'.

If a folded type transistor formed by folding back the gate of the output transistor section 102b is employed, a large size output transistor section 102b can be produced while suppressing the increase in the area thereof.

Now, the reason why the output transistor section 102b can also have a surge protection function will be described.

Surge protection has the following two objectives: preventing a large current breakdown; and a high voltage breakdown. The large current breakdown refers to a breakdown of the junction section (the PN junction section) which occurs when the density of the current flowing through a transistor (the amount of current per unit gate width) exceeds its upper limit. The high voltage breakdown refers to a breakdown caused by a short circuit between the gate and the substrate due to a strong electric field being applied mainly to the gate section. Therefore, providing an output transistor with a surge protection function important factors are: (a) to improve the capacitance value of the diffusion region of the transistor for the high voltage breakdown; and (b) to improve a current path for discharging a surge charge to the power supply and the ground for the large current breakdown.

(a) Regarding the Improvement of the Diffusion Capacitance Value

If the gate width of a surge protection transistor is increased while the diffusion capacitance of the drain is increased, it is possible to reduce the voltage that is applied to the gate section of the transistor in the internal circuit when a surge charge is applied. This is effective for preventing the high voltage breakdown. The output transistor section 102b of the present invention has a sufficiently large size, even in comparison with a conventional protection diode, to provide a current for an internal circuit via an external circuit such as an LC circuit. Therefore, where the output transistor section 102b of the present invention is used, the improvement of the diffusion capacitance value is not a problem. (b) Regarding the Improvement of the Current Path In order to reduce the current density, it is effective to increase the gate width of the transistor or to reduce the current value by inserting a resistor between the drain of the transistor and the channel under the gate thereof. One particular method for inserting a resistor is to increase the distance between the gate and the contact. In this embodiment, the distance between the gate and the contact CW was set to be comparable with the protection diode in order to set the resistance value between the gate and the contact CW (a contact between the diffusion region and the first metal layer) to the desired value or greater.

Based on these factors, it was possible to provide the output transistor section 102b of the present invention with a surge protection function.

As already described above, in reference to FIG. 9, in the first type I/O cell 105a, the line resistance Ro between the input terminal for inputting the input voltage Vin and the output terminal for outputting the output voltage Vout was 2.55 Ω. By using an output transistor section 102b which also has a surge protection function, it was possible to eliminate the aluminum line 107. As a result, the line resistance Ro is reduced from 2.55 Ω to 1.55 Ω. Therefore, based on (Expression 1), the maximum current Imax through the second type I/O cell 105b is about 1.65 times as large as the maximum current Imax through the first type I/O cell 105a.

Moreover, when a switching regulator is used as a DC/DC converter circuit, the efficiency θ is improved from 90.7% of the first type I/O cell 105a to 94.4%, based on (Expression 3). Thus, the output transistor section 102b which also has a surge protection function provides a great effect on the improvement in the DC/DC conversion performance.

As mentioned above, in the second type I/O cell 105b, the surge protection diode is eliminated, while using the output transistor 102b which also has a surge protection function. Thus, it is possible to eliminate the aluminum line resistance on the surge protection diode. As a result, a high-efficiency DC/DC conversion is realized.

Figure 11:
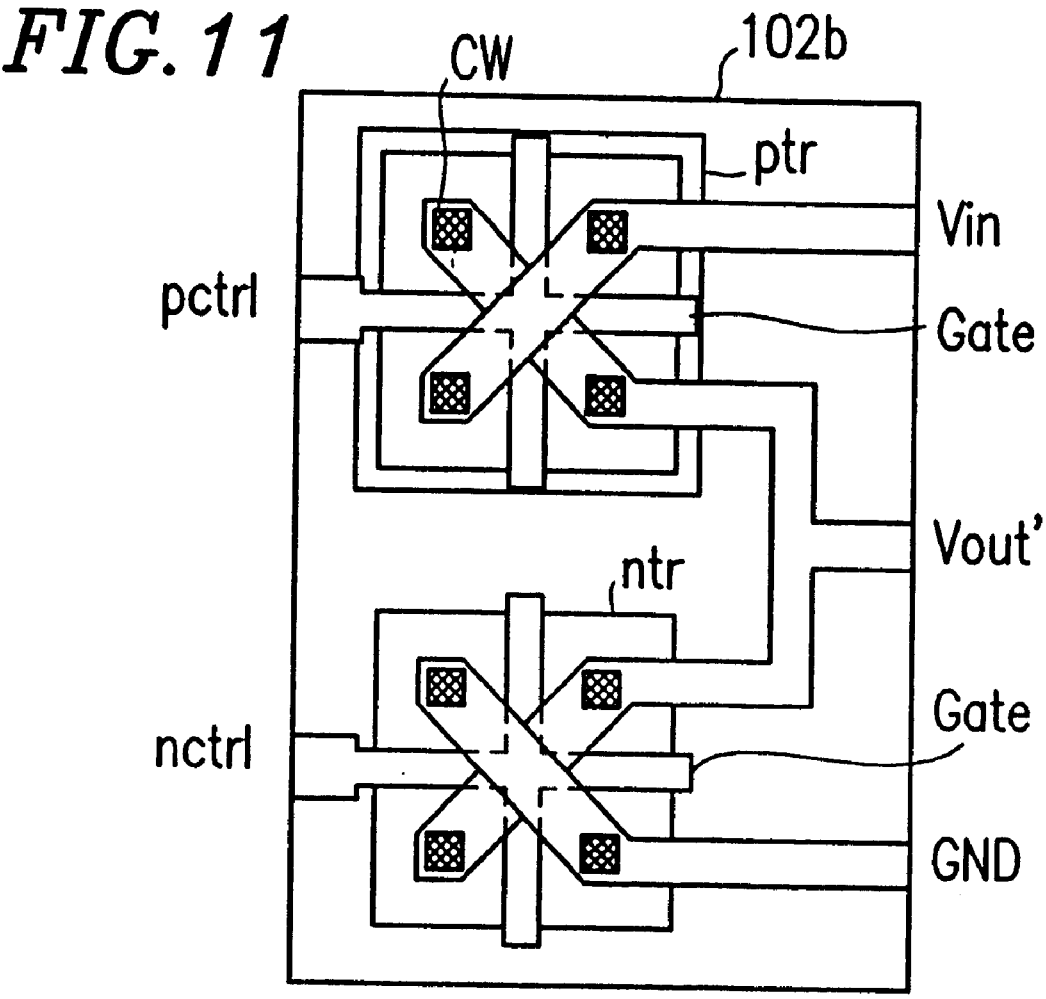
FIG. 11 is a diagram showing another exemplary layout of an output transistor section in the second type I/O cell.

FIG. 11 shows another exemplary layout of the output transistor section 102b in the second type I/O cell 105b. In order to improve the current path, it is necessary to sufficiently space the gate and the contact CW away from each other. In the case of the 0.35 μm process, the distance therebetween will be as great as about seven times the minimum distance defined in the design rule. Therefore, the area of the output transistor section 102b also having a surge protection function will be about four times as much as that in a layout with the minimum distance of the design rule.

A mesh gate transistor as shown in FIG. 11 was employed, to suppress the increase in the area of the output transistor 102b also having a surge protection function. While the transistors shown in FIG. 10 have their gates being arranged on the diffusion region in parallel with each other, the gates may be arranged into a lattice pattern as shown in FIG. 11, whereby it is possible to realize a transistor having an area that is half the area of a conventional transistor and having the same gate width as that of a conventional transistor. Since the output transistor section 102b has a large size, the effect provided by the mesh gate of reducing the area is significant.

Moreover, in the output transistor section 102b, the lattice gates shown in FIG. 11 can be further extended to obtain diffusion regions divided by the lattice-like gate. The four vicinities of a source region can be used as drain regions, or the four vicinities of a drain regions can be used as source regions. In this case, a large size output transistor section 102b can be produced while suppressing the increase in the area thereof.

Where the DC/DC converter circuit of the present invention is used in combination with an existing semiconductor integrated circuit (semiconductor chip), the increase in the area can be suppressed if the output transistor section also having a surge protection diode function is arranged only in a region where a protection diode has conventionally been arranged. With a mesh gate output transistor, an output transistor section also having a surge protection diode function can easily be arranged only in the protection diode area. Therefore, when it is desired to reduce only the voltage of the internal circuit while maintaining the compatibility of the external interface voltage in a conventional semiconductor integrated circuit, such voltage reduction can easily be achieved without increasing the area thereof by using the DC/DC converter circuit of the present invention.

Moreover, since a capacitance and a resistance exist between the diffusion region and the substrate, an amount of power is lost by the substrate resistance each time the potential in the source region and the drain region varies. Since this power loss is proportional to the area of the diffusion region, it is possible to reduce by half the amount of power lost due to the capacitance of the diffusion region, through reduction of the area thereof by the use of the mesh gate. The mesh gate transistor shown in FIG. 11 not only has an effect of reducing the area but also of reducing the power loss.

Each of FIGS. 12A and 12B shows a variation of the second type I/O cell 105b shown in FIG. 8B. In FIG. 12A, because the output terminal for outputting the output voltage Vout', the input terminal for inputting the input voltage Vin, and the terminal connected to the ground GND are spaced apart from one another, the resistance of the aluminum lines 400 exists. In order to reduce the resistance, it is also effective to arrange the input terminal for inputting the input voltage Vin and the terminal connected to the ground GND in the vicinity of the output terminal for outputting output voltage Vout' as shown in FIG. 12B.

FIG. 13A shows another variation of the second type I/O cell 105b shown in FIG. 8B. In FIG. 13A, reference numeral 500 is a metal covering a plurality of input terminals for inputting the input voltage Vin, 501 is a metal covering a plurality of output terminals for outputting the output voltage Vout', and 502 is a metal covering a plurality of terminals connected to the ground GND. In order to further minimize the line resistance in the second type I/O cell 105b, it is also effective to cover a plurality of terminals with a common metal. Moreover, the line resistance of the bonding wire is reduced by providing a plurality of terminals for each of the input voltage Vin, the output voltage Vout, and the ground GND.

FIG. 13B specifically shows how much the line resistance can be reduced with the configuration shown in FIG. 13A as compared with the first type I/O cell 105a (FIG. 9). The line resistance of the bonding wire 600 can be reduced more by inputting the input voltage Vin through a plurality of bonding wires than by inputting the input voltage Vin through a single bonding wire. In the example shown in FIG. 13B, three terminals are provided for each of the input voltage Vin, the output voltage Vout', and the ground GND. Therefore, the line resistance of the bonding wire 600 is reduced form 0.1 Ω, as in the prior art, to 0.03 Ω. Furthermore, the resistance of each plurality of terminal sections is reduced to 0.03 Ω by covering the plurality of terminals corresponding to the same voltage with a common metal.

The aluminum line 602 with a resistance of 0.5 Ω on the surge protection diode 106 which is present in the first type I.O cell 105a shown in FIG. 9 is removed in the second type I/O cell 105b shown in FIG. 13B. Therefore, the resistance by such an aluminum line is not shown in FIG. 13B. The resistance by the aluminum line in the output transistor section 102b was reduced from 0.6 Ω, as in the first type I/O cell 105a, to 0.2 Ω (the resistance of the aluminum lines 601) and 0.1 Ω (the resistance of the aluminum line 603), by providing a plurality of terminals for each common voltage, and arranging the power supply terminal and the ground terminal adjacent to the output terminal.

In summary, the line resistance Ro between the input terminal for inputting input voltage Vin and the output terminal for outputting output voltage Vout is reduced down to 0.57 Ω in the second type I/O cell 105b while it was 2.55 Ω in the first type I/O cell 105a.

Accordingly, based on (Expression 1), the maximum current Imax is 4.5 times as large as that in the prior art, and based on (Expression 3), the maximum efficiency is improved from 90.7%, as in the first type I/O cell 105a, to 98% under conditions where the output voltage Vout is 2.5 V and the load current Io is 100 mA. Thus, the second type I/O cell 105b shown in FIGS. 13A and 13B contributes greatly to the improvement in the performance of DC/DC conversion.

FIG. 14 is a diagram showing a structure of a semiconductor integrated circuit (a semiconductor chip) after it is package-sealed.

Since the line resistance of the DC/DC converter circuit includes the bonding wire resistance as well as the aluminum line resistance, the performance of the DC/DC converter circuit will further be improved by minimizing the bonding wire resistance as well as minimizing the aluminum line resistance.

Each bonding wire 600 is a line between the external input/output terminal pad, which is connected to the source/drain of the output transistor section 102b along the periphery of the semiconductor integrated circuit, and a package 700 which seals a semiconductor integrated circuit 100. Regarding the length of the bonding wire 600, normally, the bonding wire 600 which connects an external input/output terminal at one of the four corners of the semiconductor integrated circuit to the package 700 is longest, and the bonding wire 600 which extends from the midpoint of one side of the semiconductor integrated circuit is shortest. Therefore, if the I/O cell 105b is arranged along the periphery of the semiconductor circuit excluding the four corners thereof, the resistance of the bonding wire 600 is reduced, thereby improving the DC/DC conversion performance. While a semiconductor integrated circuit is usually arranged at the center of a package, in order to further reduce the resistance of the bonding wire 600, it is also effective to arrange the semiconductor integrated circuit (chip) at the position shifted from the center of the package so that the bonding wire 600 connecting the external input/output terminal pad of the I/O cell 105b with the package 700 is shortest, as shown in FIG. 14.

Each of the first type I/O cell 105a and the second type I/O cell 105b is described above to include the control circuit 101. However, these I/O cells may alternatively be configured without the control circuit 101. Moreover, each of the first type I/O cell 105a and the second type I/O cell 105b is described above to include the external input/output terminal pad. However, these I/O cells may alternatively be configured without the external input/output terminal pad. If the I/O cell is of the type which includes the external input/output terminal pad, it is advantageous in that the external input/output terminal pad and the DC/DC converter circuit can be treated simultaneously.

Furthermore, although the I/O cell arrangement area is described above to be along the chip periphery, it may alternatively be provided at a different position such as in the central portion of the chip.

Although a switching regulator type circuit has been described above as an exemplary DC/DC converter circuit of the first type I/O cell 105a and the second type I/O cell 105b, the present invention can also be applied to a three-terminal regulator type circuit as shown in FIG. 15. A three-terminal regulator is a circuit for converting an input voltage Vin to an output voltage Vout having a different value. The reference voltage is compared by a voltage comparator with a voltage Vr which is obtained by dividing an output voltage Vout by a resistance R. If Vr is higher than the reference voltage, the output voltage Vout is decreased by turning the output transistor ptr OFF, and if Vr is lower than the reference voltage, the output voltage Vout is increased by turning the output transistor ptr ON. By this operation, the output voltage Vout is adjusted to the desired voltage. Moreover, the output voltage Vout can alternatively be changed by changing the division ratio of the resistance R.

When the output transistor ptr is ON, a current passes from the input terminal for inputting the input voltage Vin to the capacitor C and to the internal circuit 104 through the output transistor ptr. The capacitor C is added in order to keep the fluctuation of the output voltage Vout within a range acceptable for the internal circuit 104. Since the capacitor C has a large capacitance value, it is often externally provided.

Industrial Applicability

According to the power supply circuit of the present invention, the line resistance in the power supply circuit is minimized by arranging the output transistor section in the vicinity of the external input/output terminal of a semiconductor chip. In this way, the DC/DC conversion performance by the power supply circuit is improved.

Furthermore, the area of the semiconductor chip on which the power supply circuit is formed is reduced by eliminating a part of the area where a protection diode has conventionally been provided and by using a mesh type transistor to configure the output transistor section.

Moreover, according to the method for designing a semiconductor chip of the present invention, a DC/DC power supply circuit cell having a power supply voltage conversion function can be treated in a manner similar to that for the other I/O cells when determining the position on the semiconductor chip where the DC/DC power supply circuit cell is to be arranged. In this way, it is possible to produce a DC/DC converter circuit having a high performance which does not depend on the designing ability of a designer. Furthermore, a flexible, high-performance DC/DC converter circuit which meets the requirements of the internal structure of a system LSI without giving a burden to a designer.

What is claimed is:

1. A method for designing a semiconductor chip, comprising the steps of:

determining positions on a semiconductor chip where a plurality of I/O cells are to be arranged, the plurality of I/O cells including at least one first type I/O cell having a power supply voltage conversion function for converting a first power supply voltage into a second power supply voltage and at least one second type I/O cell having a different function from that of the at least one first type I/O cell; and arranging the plurality of I/O cells based on the determined positions on the semiconductor chip, wherein the at least one first type I/O cell is arranged in the vicinity of at least one external input/output terminal of the semiconductor chip, and the first type I/O cell provides a converted DC voltage to an internal circuit of the semiconductor chip.

2. A method for designing a semiconductor chip according to claim 1, wherein the at least one second type I/O cell includes an input power supply pad cell for inputting a power supply voltage; the second power supply voltage output from the first type I/O cell is smoothed by a smoothing circuit provided outside the semiconductor chip; and a power supply voltage generated by the smoothing circuit is input to the semiconductor chip through the input power supply pad cell.

3. A method for designing a semiconductor chip according to claim 2, wherein the input power supply pad cell is arranged in the vicinity of a functional block to which the power supply voltage generated by the smoothing circuit is provided.

4. A method for designing a semiconductor chip according to claim 1, wherein the first type I/O cell has a control terminal for inputting a control signal which indicates one power supply voltage to be generated from among a plurality of power supply voltages.

5. A method for designing a semiconductor chip according to claim 1, wherein the first type I/O cell has a control terminal for inputting a control signal which controls whether to perform or stop the power supply voltage conversion function.

6. A method for designing a semiconductor chip according to claim 1, wherein:

the method for designing a semiconductor chip further includes the step of arranging at least one functional block as an internal circuit of the semiconductor chip; and the at least one functional block includes a power management circuit, the power management circuit changing a mode of the power supply voltage conversion function of the first type I/O cell corresponding to a predetermined functional block according to an operational state of the predetermined functional block.

7. A method for designing a semiconductor chip according to claim 1, wherein the first type I/O cell includes an output transistor section for converting the first power supply voltage Into the second power supply voltage and a control section for controlling the output transistor section.

8. A method for designing a semiconductor chip according to claim 7, wherein the output transistor section of the first type I/O cell has a surge protection function.

9. A method for designing a semiconductor chip according to claim 8, wherein the output transistor section of the first type I/O cell includes a mesh type transistor.

10. A method for designing a semiconductor chip according to claim 7, wherein the output transistor section of the first type I/O cell includes a mesh type transistor.

* * * * *

UNITED STATES PATENT AND TRADEMARK OFFICE
CERTIFICATE OF CORRECTION

PATENT NO. : 6,684,378 B2
DATED : January 27, 2004
INVENTOR(S) : Akira Yamamoto et al.

It is certified that error appears in the above-identified patent and that said Letters Patent is hereby corrected as shown below:

<u>Column 21,</u>
Line 4, "Into" should read -- into --.

Signed and Sealed this

First Day of June, 2004

JON W. DUDAS
*Acting Director of the United States Patent and Trademark Office*